(12) United States Patent
Yoshida et al.

(10) Patent No.: US 7,682,414 B2
(45) Date of Patent: Mar. 23, 2010

(54) DUST COLLECTING UNIT FOR USE IN CLEANER

(75) Inventors: Jun Yoshida, Himeji (JP); Kiyota Taniguchi, Hyogo (JP); Kenji Toyooka, Okayama (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 705 days.

(21) Appl. No.: 11/452,438

(22) Filed: Nov. 1, 2006

(65) Prior Publication Data

US 2007/0186521 A1 Aug. 16, 2007

Related U.S. Application Data

(63) Continuation-in-part of application No. 11/115,130, filed on Apr. 27, 2005, now Pat. No. 7,517,377.

(30) Foreign Application Priority Data

Apr. 28, 2004 (JP) ............................. 2004-134094

(51) Int. Cl.
*B01D 50/00* (2006.01)
(52) U.S. Cl. ............................. 55/429; 55/433; 55/467; 55/DIG. 3
(58) Field of Classification Search .................. 55/304, 55/309, 482, 486, 429, DIG. 3
See application file for complete search history.

(56) References Cited

U.S. PATENT DOCUMENTS 6,192,550 B1 2/2001 Hamada et al.
7,207,083 B2 4/2007 Hayashi et al.
7,337,493 B2 * 3/2008 Ueyama et al. ............... 15/352

FOREIGN PATENT DOCUMENTS

| JP | 60-215341 A | 10/1985 |
|----|-------------|---------|
| JP | 2000-342492 A | 12/2000 |
| JP | 2004-065699 A | 3/2004 |
| JP | 2004-089263 A | 3/2004 |
| JP | 2004-121648 A | 4/2004 |

OTHER PUBLICATIONS

Office Action dated Jan. 29, 2008, issued in corresponding U.S. Appl. No. 11/115,130.
Office Action mailed Sep. 4, 2008 in Corresponding Japanese Patent Application No. 2004-134094.

\* cited by examiner

*Primary Examiner*—Robert A Hopkins
(74) *Attorney, Agent, or Firm*—Westerman, Hattori, Daniels & Adrian, LLP

(57) ABSTRACT

This dust collecting unit for use in a cleaner includes an inlet port through which air and dust is taken in, a dust catch room into which the air and dust taken in through the inlet port is led, an air flow path for separating a part of air taken in through the inlet port and ensuring air flow, an air outlet port through which the air having passed through the dust catch room and the air flow path is discharged, and a filter provided on the upstream side of the air outlet port for preventing dust from flowing to the air outlet port from the dust catch room and the air flow path.

5 Claims, 27 Drawing Sheets

DUST COLLECTING UNIT FOR USE IN CLEANER

CROSS-REFERENCE TO RELATED APPLICATION

This is a continuation-in-part of application Ser. No. 11/115,130, filed Apr. 27, 2005 now U.S. Pat.No. 7,517,377.

BACKGROUND OF THE INVENTION

1. Field of the Invention

The present invention relates to a dust collecting unit for catching dust contained in sucked air.

2. Description of Related Art

Upright type (longitudinal type) cleaners are known each of which includes a suction section provided with a plurality of wheels adapted to roll on the floor and a long-shaped main body pivotally attached to the suction section at one end thereof, and which can be used in a position somewhat inclined rearward with respect to the vertical direction by a user with holding a handle provided at the other end of the main body (for example, Unexamined Patent Publication (Kokai) No. 2000-342492 published by Japan Patent Office on Dec. 12, 2000). When unused, an upright type cleaner can be maintained in a position in which the main body is upright in the vertical direction with respect to the suction section.

A dust collecting unit of such a kind of cleaner includes a substantially cylindrical dust collecting case for catching dust contained in the air sucked through the suction section. The dust collecting case is provided with an inlet port through which air is taken into the dust collecting case in the direction of the tangential line, and the air taken into the dust collecting case swirls at a high speed in the dust collecting case. Then, dust is separated from the air swirling at a high speed in the dust collecting case by a filter.

Such a cleaner has an advantage that no paper package is used for storing dust, and therefore it is economical.

However, the abovementioned conventional art has a problem that the air sucked through the inlet port is caused to swirl in the dust collecting case, and therefore air flow in the dust collecting case becomes complicated thus to reduce the suction efficiency of the cleaner.

SUMMARY OF THE INVENTION

An object of the present invention is to provide a dust collecting unit for use in a cleaner which can restrain lowering of the dust collecting efficiency (suction power) thereof caused by storing of dust.

For the purpose of achieving the abovementioned object, a dust collecting unit according to the present invention includes a dust catch room for catching dust contained in the sucked air and an air flow path for separating a part of the air led to the dust catch room side. Therefore, even if a large amount of dust is stored in the dust catch room and thus the resistance becomes large when the air passes through the dust catch room, air flow can be ensured by the air flow path. As a result, the whole of the air flow passing through the dust collecting unit is maintained and the cleaning efficiency (power) is not lowered even if dust is stored.

The abovementioned and other objects, features and advantages of the present invention will become more apparent from the following description of embodiments given with reference to the appended drawings.

DESCRIPTION OF THE PREFERRED EMBODIMENTS

Figure 1:
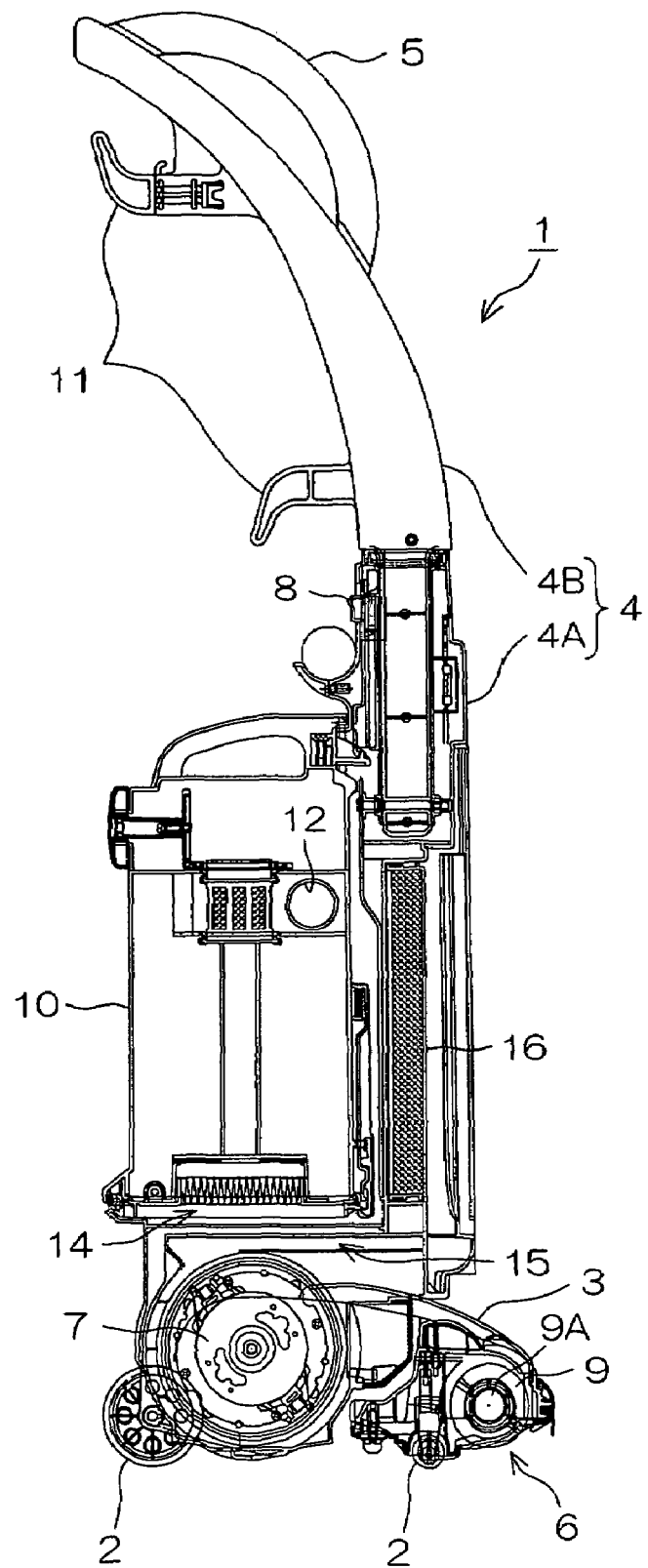
FIG. 1 is an outline view showing the structure of a cleaner according to a first embodiment of the present invention and this view is a left side view.
Figure 2:
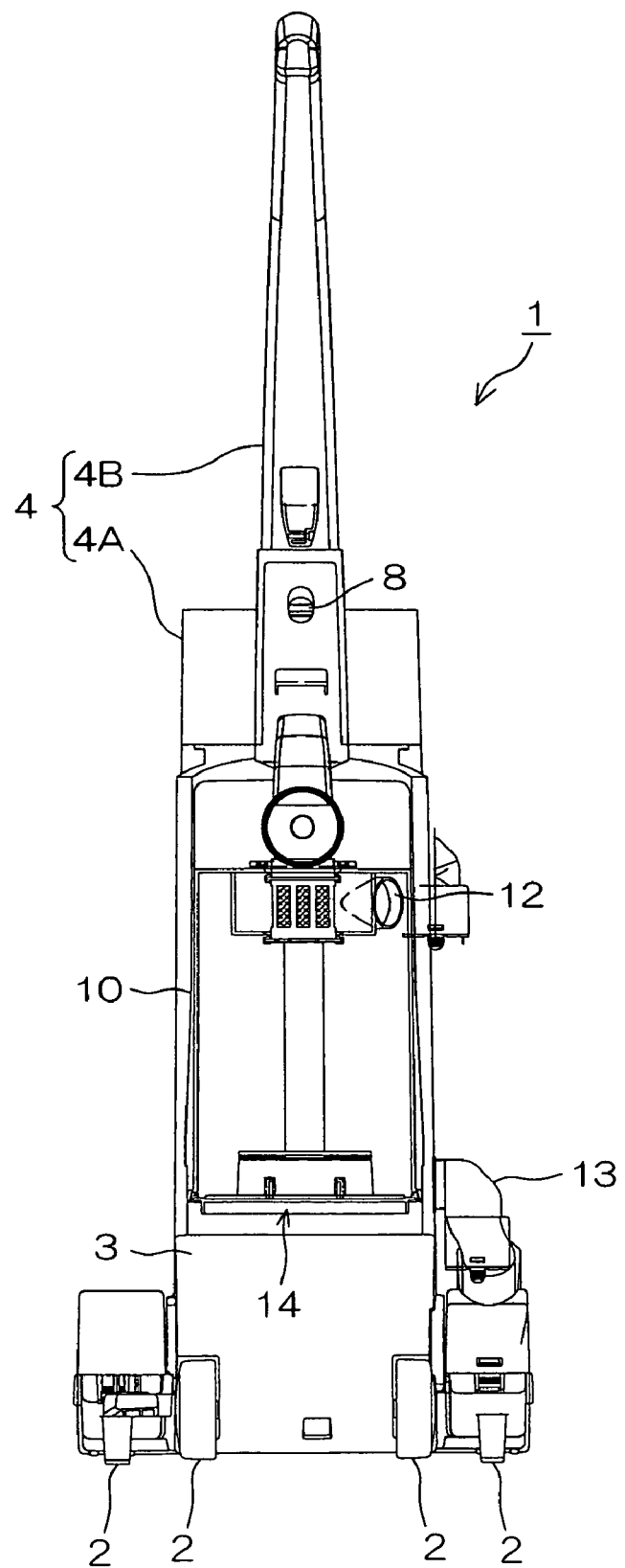
FIG. 2 is a rear view of the cleaner of the first embodiment.

FIGS. 1 and 2 are outline views showing the structure of a cleaner according to a first embodiment of the present invention. FIG. 1 is a left side view and FIG. 2 is a rear view. In each of these views, a part of the cleaner 1 is shown in a sectional view for simplification of the inner arrangement of the cleaner 1.

Referring to FIGS. 1 and 2, the cleaner 1 includes a suction section 3 provided with a plurality of wheels 2 which roll on the floor, and a long-shaped main body 4 pivotally attached, at one end (the lower end), to the suction section 3. This cleaner is an upright type (longitudinal type) cleaner which is used in a position somewhat inclined rearward with respect to the vertical direction by a user with holding a handle 5 provided at the other end (upper end) of the main body 4. When unused, this cleaner 1 can be maintained in a position in which the main body 4 is upright in the vertical direction with respect to the suction section 3 (position as shown in FIGS. 1 and 2).

A suction port 6 is provided on the front side of the bottom surface of the suction section 3. On the rear side of the inside of the suction section 3, provided is an electric blower 7 including a motor and a fan adapted to be rotated by the motor.

When cleaning with this cleaner 1, an electric power switch 8 provided on the main body 4 (for example, at the upper end of a belowmentioned lower member 4A) is turned on to start the driving of the electric blower 7, and thereby dust on the floor opposed to the suction port 6 is sucked through the suction port 6 into the suction section 3. On the front side of the inside of the suction section 3, provided is a rotary brush 9 rotatable around a rotation shaft 9A elongated in the lateral direction. The outer circumferential surface of this rotary brush 9 faces the suction port 6. When the electric blower 7 is driven, the rotary brush 9 is rotated by the pressure of the air sucked through the suction port 6 into the suction section 3 thereby to assist dust to flow through the suction port 6 into the suction section 3 and at the same time to prevent extraneous substances from flowing through the suction port 6 into the suction section 3. However, the rotary brush 9 may be driven to rotate by a motor.

A dust collecting unit 10 for catching dust contained in the air sucked through the suction section 3 is detachably attached to the main body 4. The main body 4 is provided with a lower member 4A which is disposed above the suction section 3 and carries the dust collecting unit 10, and an upper member 4B which has one end (the lower end) inserted into the upper portion of the lower member 4A and is curved so as to be inclined rearward as it extends upwardly, so that the whole main body 4 has a shape elongated in the vertical direction. Two end portions of an arched handle 5 are connected to the upper portion of the front surface of the upper member 4B. When a user gripping this handle 5 applies a force in the direction of the elongation of the main body 4, a propelling force is given to the main body 4 and the suction section 3 connected to the main body 4, so that the cleaner 1 can move with the wheels 2 being rotated. Two code winding parts 11 are projected from the upper and lower end portions respectively of the rear surface of the upper member 4B. When the cleaner 1 is unused or a power code of the cleaner 1 is excessively long, the code can be wound round the two code winding parts 11 with the code stretched therebetween.

The dust collecting unit 10 is provided with an inlet port 12. Connected to the inlet port 12 of the dust collecting unit 10 is one end of a hose 13 the other end of which is connected to the suction section 3. Thereby, the air and dust sucked into the suction section 3 is transferred through the hose 13 toward the dust collecting unit 10 and taken through the inlet port 12 into the dust collecting unit 10. In the process that the air containing dust taken into the dust collecting unit 10 passes the dust collecting unit 10, dust contained in the air is caught, and the air is discharged downward through an air outlet port 14 provided in the bottom surface of the dust collecting unit 10. Provided inside the lower member 4A of the main body 4 is a guide path 15 which leads the air discharged from the air outlet port 14 toward the front side. The air led through the guide path 15 toward the front side is discharged through an air outlet filter 16 to the outside of the cleaner 1.

Figure 3:
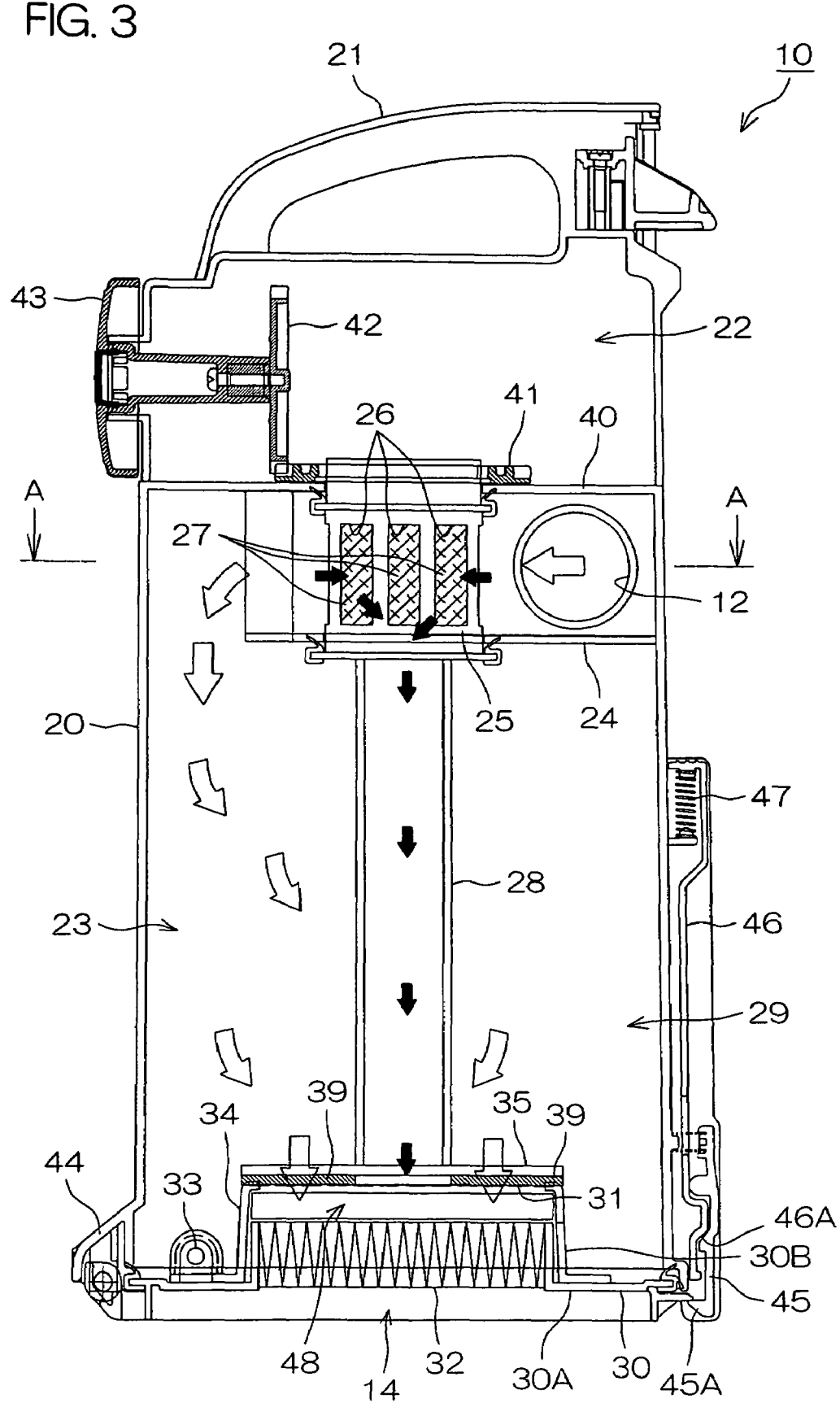
FIG. 3 is a sectional view of a dust collecting unit according to the first embodiment in which the dust collecting unit sectioned along a vertical plane in the longitudinal direction is seen from the left side.
Figure 4:
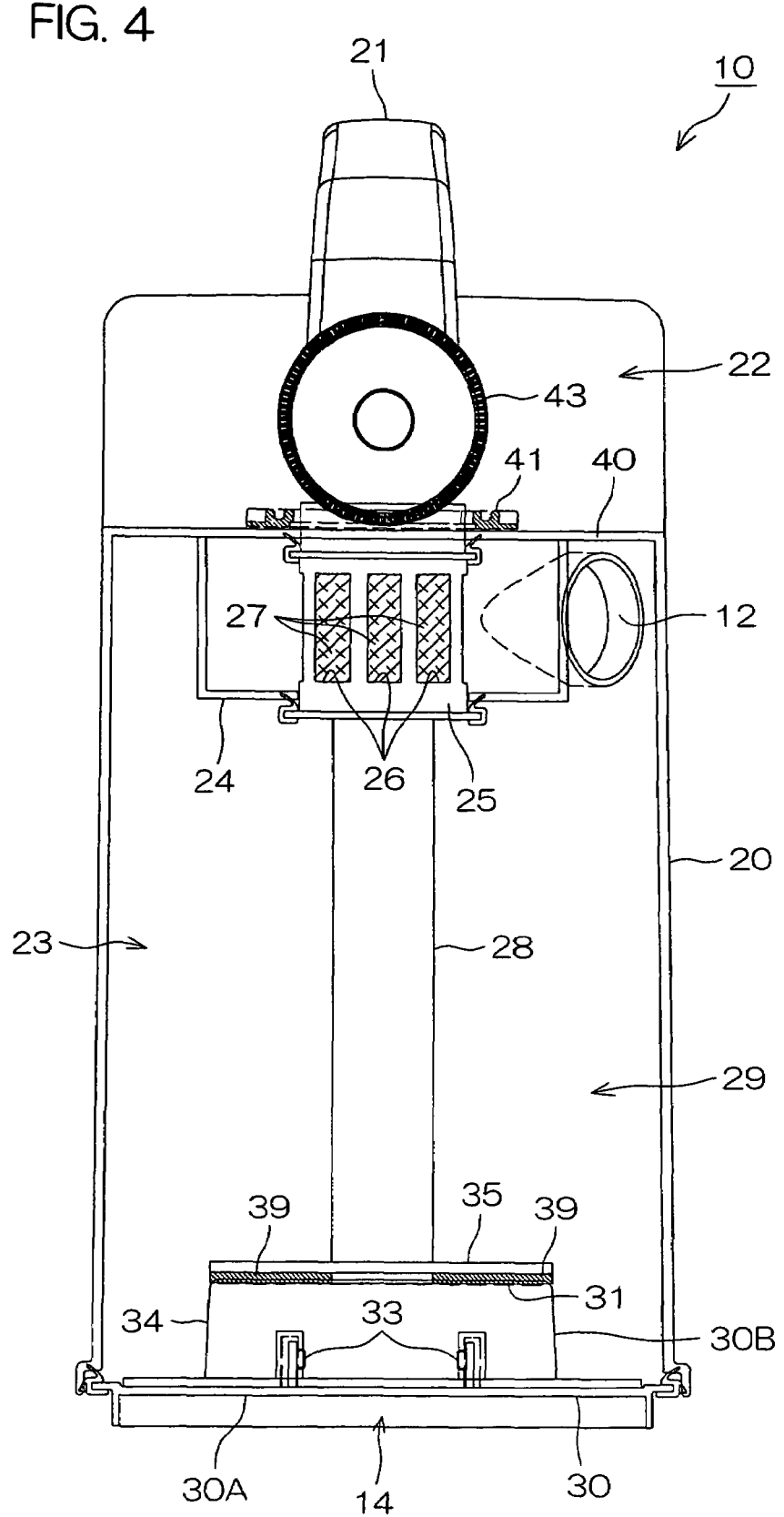
FIG. 4 is a rear view of the dust collecting unit according to the first embodiment.
Figure 5:
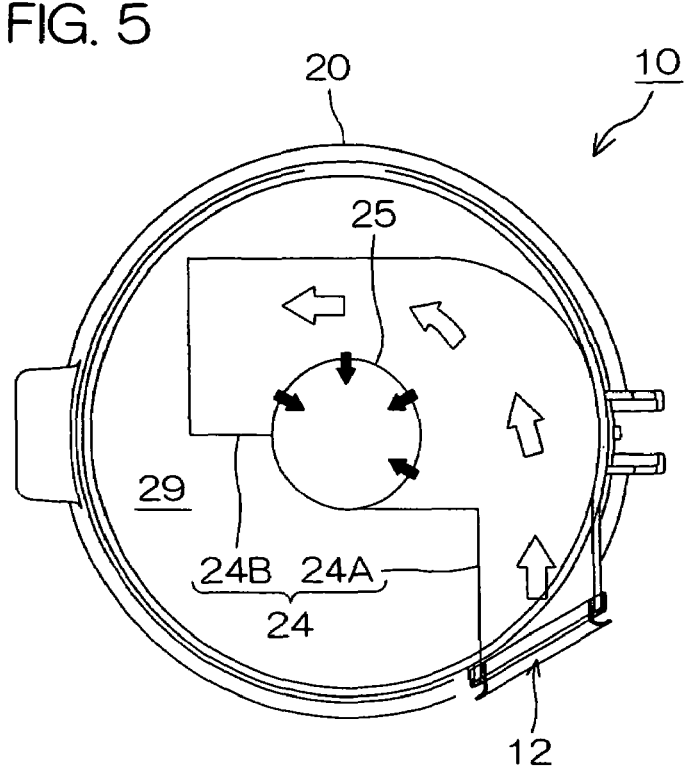
FIG. 5 is a sectional view of the dust collecting unit according to the first embodiment seen along the arrow A-A shown in FIG. 3.

FIG. 3 is a sectional view of the dust collecting unit 10 sectioned along a vertical plane in the longitudinal direction and seen from the left side. FIG. 4 is a rear view of the dust collecting unit 10 in which a part of the dust collecting unit 10 is shown in a sectional view for simplification of the inner arrangement thereof. FIG. 5 is a sectional view of the dust collecting unit 10 seen along the arrow A-A shown in FIG. 3.

Referring to FIGS. 3 to 5, the dust collecting unit 10 includes a substantially cylindrical dust collecting case 20 which defines the outline of the dust collecting unit 10. On the upper end portion of the dust collecting case 20, provided is a gripping part 21 which is gripped when the dust collecting case 20 is attached to or detached from the cleaner 1. The inside of the dust collecting case 20 is divided into an upper chamber 22 defined in the upper end portion thereof and a lower chamber 23 defined from the middle portion to the lower end portion thereof. The inlet port 12 is provided in the upper end portion of the lower chamber 23, and the air taken through the inlet port 12 is led in the direction of a tangential line of the outer circumferential surface of the dust collecting case 20 to be introduced into the lower chamber 23.

In the upper portion of the lower chamber 23, provided is a horizontally elongated pipe-shaped guide member 24 one end of which is connected to the inlet port 12. More specifically, the guide member 24 has a substantially L-shaped form including a laterally elongated upstream side part 24A one end of which is connected to the inlet port 12 and a downstream side part 24B elongated rearward from the other end of the upstream side part 24A. The inside (inner angle side) of a portion adjacent to the connecting portion of the upstream side part 24A and the downstream side part 24B is positioned on the central axis of the dust collecting case 20. In the guide member 24, provided is a cylindrical filter 25 substantially in the form of a cylinder vertically elongated along the central axis of the dust collecting case 20. In other words, the guide member 24 is extended along the outer circumferential surface of the cylindrical filter 25, and the air taken in through the inlet port 12 flows along the outer circumferential surface of the cylindrical filter 25 to be led to the distal end of the guide member 24. The cylindrical filter 25 is provided in its outer circumferential surface with a plurality of air holes 26, and each of the air holes 26 is covered with a mesh filter 27. The air hole 26 is opened in a direction substantially in parallel with the air stream in the guide member 24.

The air taken in through the inlet port 12 passes through the guide member 24 to be led to the distal end of the downstream side part 24B as shown with white arrows in FIGS. 3 and 5, and a part of the air flows into the air holes through the mesh filters 27 to be led into the cylindrical filter 25 as shown with black arrows in FIGS. 3 and 5. On the other hand, dust contained in the air taken in through the inlet port 12, since being heavier than the air, passes the outer side (outer angle side) of the guide member 24 to be led to the distal end of the downstream side part 24B by an inertia force. The cylindrical filter 25 is disposed in a position away from the flowing path of the dust in the guide member 25, and dust contained in the air taken in through the inlet port 12 is kept away from the cylindrical filter 25 and discharged from the distal end of the guide member 24 into the lower chamber 23. Thereby, the cylindrical filter 25 can be prevented from hindering the dust flow in the guide member 24.

In the dust collecting case 20, a branched pipe 28 is so disposed as to extend downward along the central axis of the dust collecting case 20 with one end (the upper end) of the branched pipe 28 being connected to the cylindrical filter 25. The air flowing from the air holes 26 through the mesh filer 27 into the cylindrical filter 25 is led downward through the branched pipe 28. A space outside the branched pipe 28 in the lower chamber 23 defines a dust catch room 29 for catching and storing dust discharged from the distal end of the guide member 24. In other words, a filter member 30 is provided at the bottom of the dust collecting case 20 (the lower chamber 23) so that when the air discharged from the guide member 24 falls down and passes the filter member 30, dust contained in the air is caught by the filter member 30 to be stored in the dust catch room 29.

The bottom surface of the dust collecting case 20 is opened and the opening defines the air outlet port 14 for discharging the air from which dust has been caught A filter member 30 is detachably attached to the lower end portion of the dust collecting case 20 so that it covers the air outlet opening 14. The filter member 30 includes a mesh filter 31 having a substantially circular shape in plan view and facing the dust catch room 29, and a paper filter 32 having a substantially circular shape in plan view and disposed below the mesh filter 31 with a predetermined space therebetween. The paper filter 32 is held by a lower holding member 30A having a shape corresponding to the air outlet port 14, while the mesh filter 31 is held by an upper holding member 30B pivotally attached to the rear end portion of the upper surface of the lower holding member 30A via a hinge 33. In the central portion of the upper holding member 30B, an upward protruded cylindrical part 34 is provided so as to enclose the outer circumference of the paper filer 32 held by the lower holding member 30A, and the mesh filter 31 is attached so as to cover the upper end opening of the cylindrical part 34.

Figure 6:
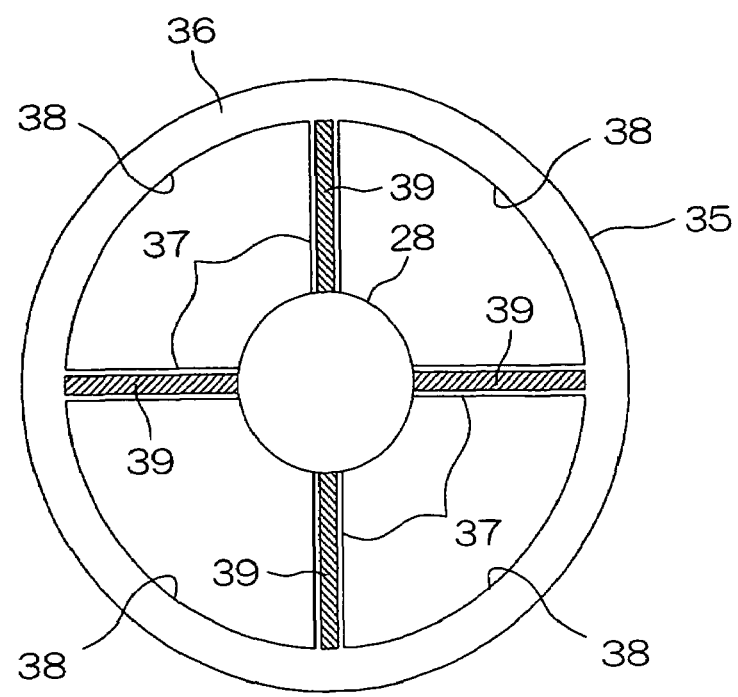
FIG. 6 is a bottom view of a branched pipe of the first embodiment.

In the lower end portion of the branched pipe 28, a substantially circular flange part 35 is provided so as to be stretched in the diametrical direction and opposed to the upper end opening of the cylindrical part 34 provided on the upper holding member 30B of the filter member 30. FIG. 6 is a bottom view of the branched pipe 28. As shown in FIG. 6, the flange part 35 stretched in the diametrical direction from the lower end portion of the branched pipe 28 includes an annular part 36 having a shape corresponding to the upper end face of the cylindrical part 34 of the filter member 30, and a plurality of (e.g. four) connecting parts 37 connecting the inner circumferential surface of the annular part 36 and the outer circumferential surface of the branched pipe 28.

The connecting parts 37 are respectively extended in the diametrical direction from the outer circumferential surface of the lower end portion of the branched pipe 28 respectively with a space of a predetermined angle (e.g. 90 degrees) therebetween. A plurality of (e.g. four) openings defined by the inner circumferential surface of the annular part 36 and the connecting parts 37 constitute air ports 38 for passing the air flowing into the dust catch room 29 toward the filter member 30. In other words, as shown with white arrows in FIG. 3, the air flowing from the guide member 24 into the dust catch room 29 passes the air ports 38 to be led to the filter member 30, and passes the mesh filter 31 and the paper filter 32 thus to be discharged through the air outlet port 14. Rather large dust (larger dust) of the dust contained in the air delivered from the dust catch room 29 toward the air outlet port 14 is caught by the mesh filter 31 to be stored in the dust catch room 29, while rather small dust (minute dust) having passed the mesh filter 31 is caught by the paper filter 32. On the other hand, the air led through the branched pipe 28 downward is brought toward the central portion of the filter member 30 from the lower end potion of the branched pipe 28, and passes the mash filter 31 and the paper filter 32 thus to be discharged through the air outlet port 14.

A brush member 39 (e.g. bristles) is attached to the lower surface of each connecting part 37 of the flange part 35. The distal end portions of these brush members 39 are in contact with the upper surface of the mesh filter 31. In this embodiment, the cylindrical filter 25 and the branched pipe 28 can be integrally rotated, and with this rotation, the distal end portions of the brush members 39 slidably contact the mesh filter 31. More specifically, the upper end portion of the cylindrical filter 25 penetrates a division wall 40 dividing the upper chamber 22 and the lower chamber 23 thus to face the upper chamber 22, and with the lower surface of the flange part 41 provided on the outer circumferential surface thereof contacting the upper surface of the division wall 40, the cylindrical filter 25 and the branched pipe 28 connected to the cylindrical filter 25 are rotatably held.

A plurality of teeth are provided on the outer peripheral edge of the upper surface of the flange part 41 provided on the upper end portion of the cylindrical filter 25. A gear 42 engageable with the teeth is provided in the upper chamber 22 of the dust collecting case 20. A shaft of the gear 42 is extended in the longitudinal direction and is connected to a dial 43 stretched outward from the rear end of the circumferential surface of the dust collecting case 20. When the dial 43 is rotated, the flange part 41 is rotated via the gear 42, and the cylindrical filer 25 and the branched pipe 28 are rotated. Thereby, the flange part 35 provided on the lower portion of the branched pipe 28 is rotated and the distal end portion of the brush member 39 attached to the flange part 35 slidably contacts the mesh filter 31 so that dust attached to the upper surface of the mesh filter 31 can be detached and the clogging of the mesh filter 31 can be eliminated.

In the rear lower end portion of the dust collecting case 20, provided is a latching part 44 for latching the rear end portion of the filter member 30 (lower holding member 30A). On the other hand, in the lower end portion of the outer circumferential surface of the dust collecting case 20, provided is a latching claw 45 for latching the front end portion of the filter member 30 (lower holding member 30A). The latching claw 45 is longitudinally pivotally movable about the upper end portion thereof, and in a state that the latching claw 45 is vertically extended along the outer circumferential surface of the dust collecting case 20, a claw part 45A formed in the lower end portion thereof can be latched onto the front end portion of the filter member 30.

On the front end portion of the outer surface of the dust collecting case 20, an operating lever 46 is extended from the middle portion in the vertical direction to the lower end portion thereof. The operating lever 246 is operated for releasing the engagement of the latching claw 245 with the filter member 30. The lower end portion of the operating lever 46 is inserted between the outer circumferential surface of the dust collecting case 20 and the latching claw 45. The operating lever 46 is urged upward by a spring 47 provided at the upper end potion thereof. By pushing down the operating lever 46 against the urging force of the spring 47, the latching claw 45 is pushed forward by an inclined surface 46A provided in the lower end portion of the operating lever 46 so that the engagement of the latching claw 45 with the filter member 30 can be released. In a state that the latching claw 45 is disengaged, the filter member 30 can be detached from the dust collecting case 20.

By detaching the filter member 30 from the dust collecting case 20, the air outlet port 14 is opened and dust stored in the dust catch room 29 can be easily thrown away through the air outlet port 14. Further, minute dust stored in the branched pipe 28 can be also thrown away. With such an arrangement, by taking out the filter member 30 from the dust collecting case 20, detaching away dust attached to the mesh filter 31 and the paper filter 32 and attaching the filter member 30 to the dust collecting case 20 again, the filter can be repeatedly used. Therefore, this cleaner is more economical than a cleaner of a type in which dust is caught in a disposable paper package.

In a state that the filter member 30 is detached from the dust collecting case 20, the upper holding member 30B can be pivotally moved upward about the hinge 33 with respect to the lower holding member 30A. Since the mesh filter 31 and the paper filter 32 are spaced from each other with a predetermined space, a room 48 is defined therebetween. By pivotally moving the upper holding member 30B with respect to the lower holding member 30A, the room 48 can be opened. By opening the room 48 by pivotally moving the upper holding member 30B with respect to the lower holding member 30A, disposing another filter above the paper filter 32 and closing the upper holding member 30B, a filter other than the mesh filter 31 and the paper filter 32 can be provided in the room 48. As the abovementioned another filter, for example, a filter for exclusive use such as a urethane filer can be used or tissue paper sheets can be used. By providing another filter in the room 48 defined between the mesh filter 31 and a paper filter 32 as abovementioned, dust is hardly attached to the paper filter 32 and therefore the paper filter 32 can be easily maintained only by exchanging the abovementioned another filter.

In this embodiment, even if a large amount of dust is stored in the dust catch room 29 and the resistance becomes large at the time when air passes through the dust catch room 29, an air stream is ensured by the branched pipe 28. Therefore, the whole air stream passing through the dust collecting unit 10 can be maintained and the cleaning efficiency (power) is not lowered.

Further, since the mesh filter 27 provided in the connecting portion of the guide member 24 and the cylindrical filter 25 can prevent dust from flowing into the branched pipe 28, dust is not stored in the branched pipe 28 and air flow is not reduced there.

Further, the air flows from the upper portion down to the lower portion in the dust catch room 29, and dust flows with the air flow and is stored in the lower portion of the dust catch room 29. Therefore, dust is pushed down by the air from the upper portion in the dust catch room 29 and condensed not to become bulky.

Further, the air and dust taken in through the inlet port 12 flows mainly through the guide member 24 to enter the dust catch room 29. Since the air ports 26 of the branched pipe 28 are substantially in parallel with the direction of the air flow in the guide member 24, dust does not go through the air ports 26 into the branched pipe 28 but flows through the guide member 24 in which dust flows more easily. Further, since the mesh filters 27 are provided, dust is more surely prevented from entering the branched pipe 28. Only a sufficient amount of air to ensure air flow flows through the air ports 26 into the branched pipe 28.

Further, since the air flowing from the upper portion down to the lower portion in the dust catch room 29 passes straightly the filter member 30 in the lower portion and is discharged downward through the air outlet port 14, the air flow in the dust catch room 29 is simple and the power is not reduced.

Further, since the direction of the air flow in the branched pipe 28 is the same with that of the air flow in the dust catch room 29, the air flows smoothly and the power is not reduced.

Furthermore, since the outlet of the branched pipe 28 faces a portion of the filter member 30 the position of which is different from the position of a portion of the filter member 30 through which the air having passed through the dust catch room 29 passes, the air flow flowing from the branched pipe 28 through the filter member 30 to the air outlet port 14 can be ensured even if a large amount of dust is stored on this side of the filter member 30.

Figure 7:
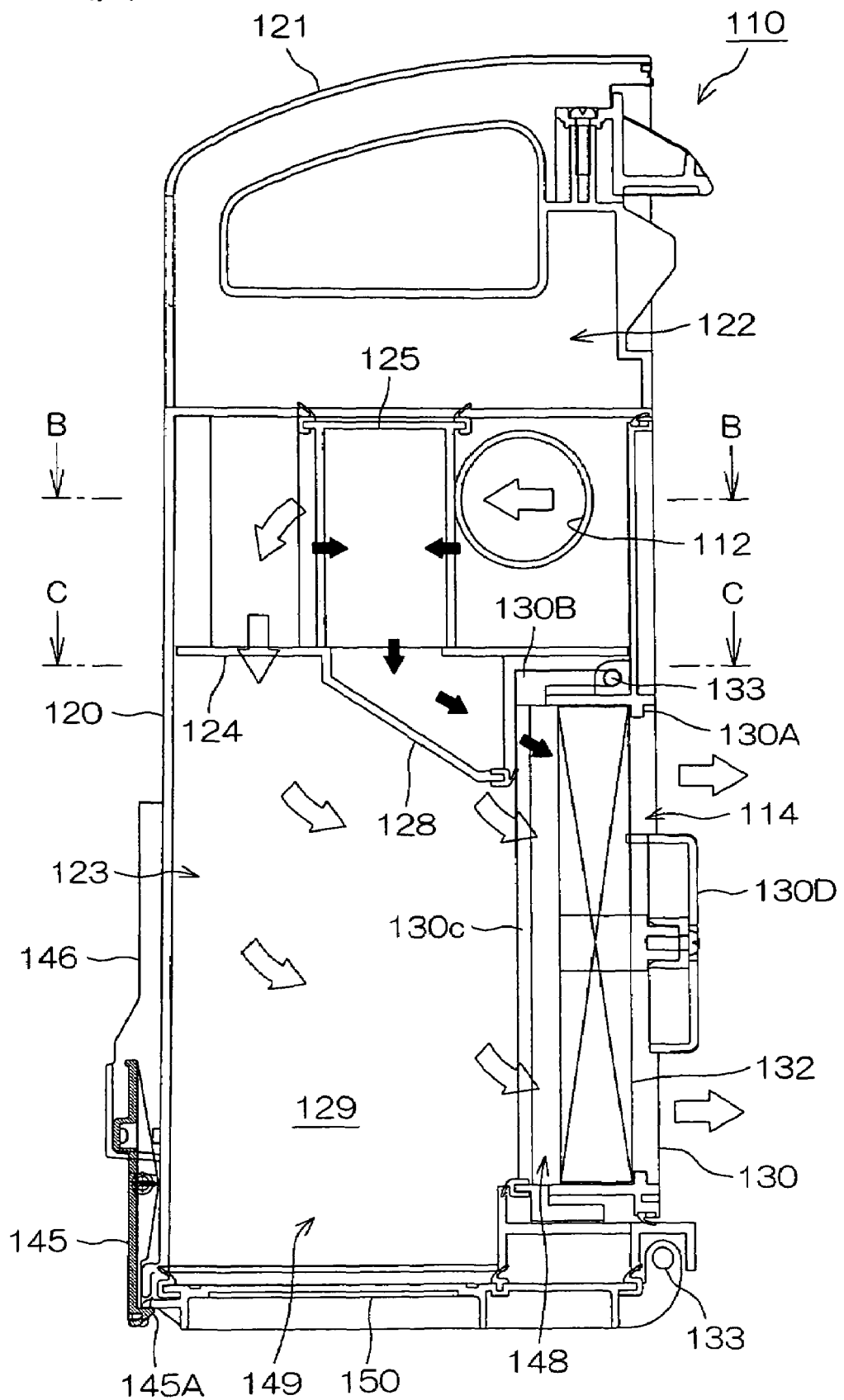
FIG. 7 is a sectional view of the dust collecting unit according to the first modified embodiment in which the dust collecting unit sectioned along a vertical plane in the longitudinal direction is seen from the left side.
Figure 8:
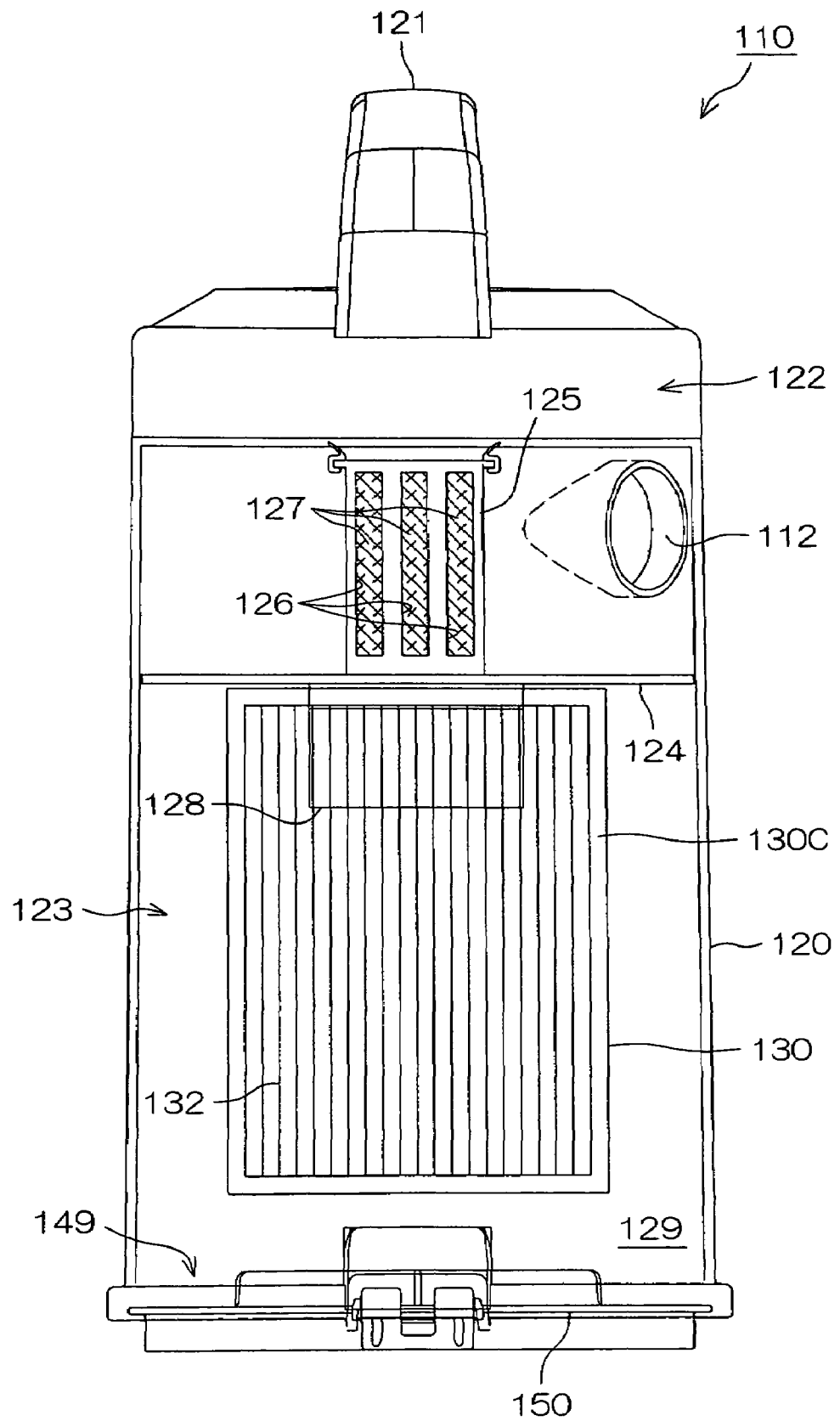
FIG. 8 is a rear view of the dust collecting unit according to the first modified embodiment.
Figure 9:
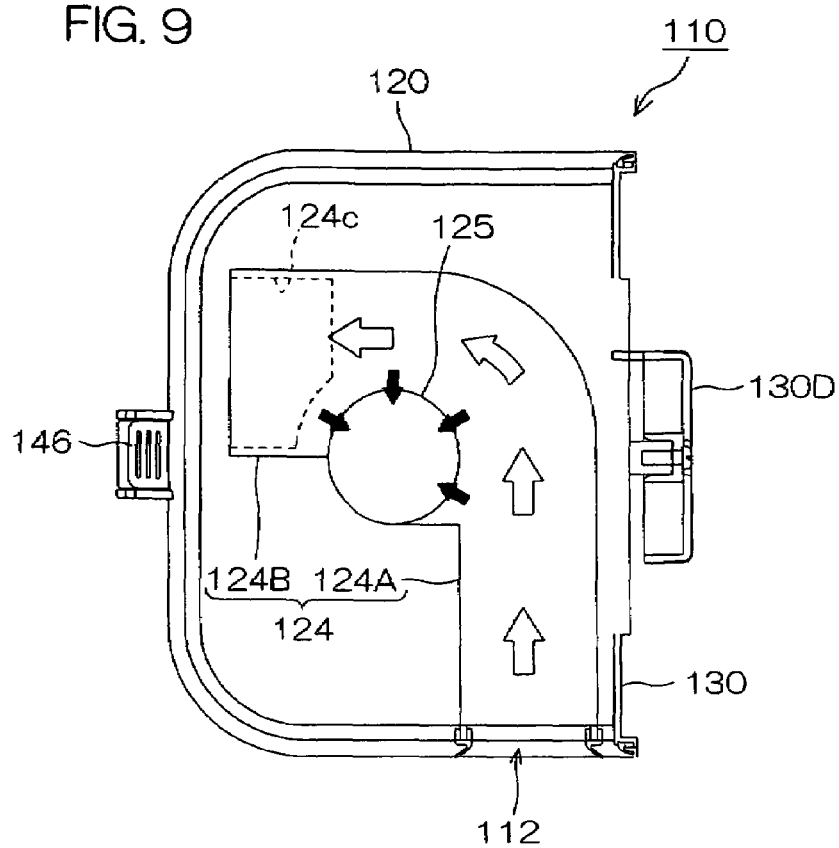
FIG. 9 is a sectional view of the dust collecting unit according to the first modified embodiment seen along the arrow B-B shown in FIG. 7.
Figure 10:
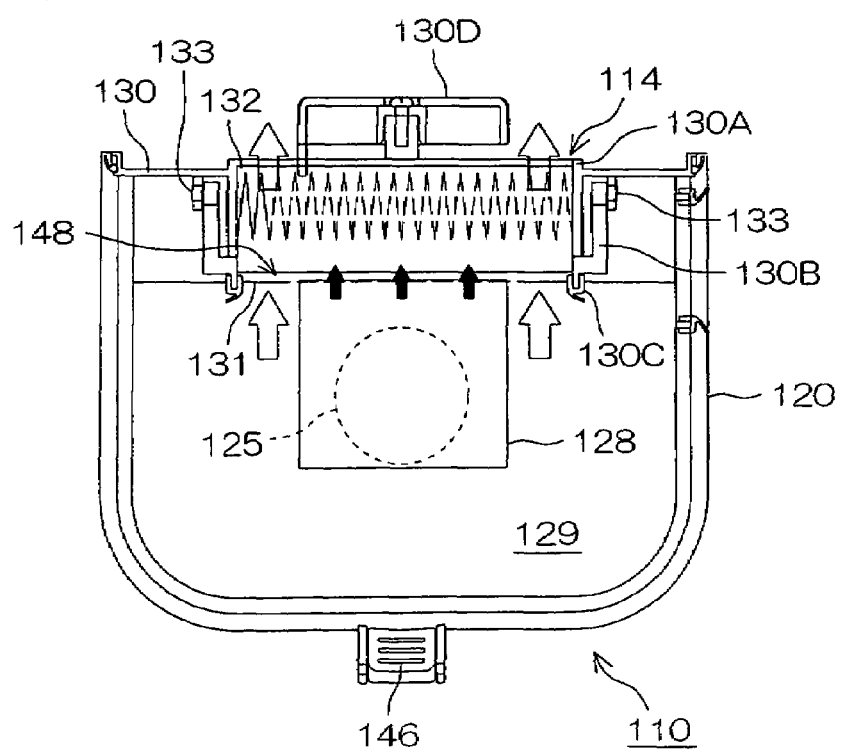
FIG. 10 is a sectional view of the dust collecting unit according to the first modified embodiment seen along the arrow C-C shown in FIG. 7.

FIG. 7 is a sectional view of a dust collecting unit 110 according to the first modified embodiment in which the dust collecting unit 110 sectioned along a vertical plane in the longitudinal direction is seen from the left side. FIG. 8 is a rear view of the dust collecting unit 110 according to the first modified embodiment with a part thereof being shown in a sectional view for simplification of the inner arrangement. FIG. 9 is a sectional view of the dust collecting unit 110 according to the first modified embodiment seen along the arrow B-B shown in FIG. 7. FIG. 10 is a sectional view of the dust collecting unit 110 according to the first modified embodiment seen along the arrow C-C shown in FIG. 10.

Referring to FIGS. 7 to 10, the dust collecting unit 110 includes a substantially rectangular dust collecting case 120 which defines the outline of the dust collecting unit 110. On the upper end portion of the dust collecting case 120, provided is a gripping part 121 which is gripped when the dust collecting case 120 is attached to or detached from the cleaner 1. The inside of the dust collecting case 120 is divided into an upper chamber 122 defined in the upper end portion thereof and a lower chamber 123 defined from the middle portion to the lower end portion thereof. An inlet port 112 is provided in the left surface of the dust collecting case 120 and directed in the lateral direction to face the upper end portion of the lower chamber 123.

In the upper portion of the lower chamber 123, provided is a horizontally elongated pipe-shaped guide member 124 one end of which is connected to the inlet port 112. More specifically, the guide member 124 has a substantially L-shaped form including a laterally elongated upstream side part 124A one end of which is connected to the inlet port 112 and a downstream side part 124B elongated rearward from the other end of the upstream side part 124A. The inside (inner angle side) of a portion adjacent to the connecting portion of the upstream side part 124A and the downstream side part 124B is positioned on the central axis of the dust collecting case 120. In the guide member 124, provided is a cylindrical filter 125 substantially in the form of a cylinder vertically elongated along the central axis of the dust collecting case 120. In other words, the guide member 124 is extended along the outer circumferential surface of the cylindrical filter 125, and the air taken in through the inlet port 112 flows along the outer circumferential surface of the cylindrical filter 125 to be led to the distal end of the guide member 124. The cylindrical filter 125 is provided in its outer circumferential surface with a plurality of air holes 26, and each of the air holes 126 is covered with a mesh filter 127. The air hole 126 is opened in a direction substantially in parallel with the air stream in the guide member 124.

The air taken in through the inlet port 112 passes through the guide member 124 to be led to the distal end of the downstream side part 124B as shown with white arrows in FIGS. 7 and 9, and a part of the air flows into the air holes 126 through the mesh filters 127 to be led into the cylindrical filter 125 as shown with black arrows in FIGS. 7 and 9. On the other hand, dust contained in the air taken in through the inlet port 112, since being heavier than the air, passes the outer side (outer angle side) of the guide member 124 to be led to the distal end of the downstream side part 124B by an inertia force. The cylindrical filter 125 is disposed in a position away from the flowing path of the dust in the guide member 124, and dust contained in the air taken in through the inlet port 112 is kept away from the cylindrical filter 125 to be led to the distal end of the guide member 124 and discharged through an opening 124C provided in the lower surface of the distal end of the guide member 124 into the lower chamber 123. Thereby, the cylindrical filter 125 can be prevented from hindering the dust flow in the guide member 124.

In the dust collecting case 120, a branched pipe 128 is so disposed as to obliquely downwardly extend toward the front side with one end (the upper end) of the branched pipe 128 being connected to the lower end of the cylindrical filter 125. The air flowing from the air holes 126 through the mesh filer 127 into the cylindrical filter 125 is led forward through the branched pipe 128. A space outside the branched pipe 128 in the lower chamber 123 defines a dust catch room 129 for catching and storing dust discharged from the distal end of the guide member 124. In other words, a filter member 130 is provided on the front surface of the dust collecting case 120 (the lower chamber 123), and when the air discharged from the guide member 124 goes forward and passes the filter member 130, dust contained in the air is caught by the filter member 130 to be stored in the dust catch room 129.

The front surface of the dust collecting case 120 is provided with a substantially rectangular opening, which defines the air outlet port 114 for discharging the air from which dust has been caught. A filter member 130 is detachably attached to the front end portion of the dust collecting case 120 so that it covers the air outlet opening 114. The filter member 130 includes a mesh filter 131 having a substantially rectangular shape in a front view and facing the dust catch room 129, and a paper filter 132 having a substantially rectangular shape in a front view and disposed in front of the mesh filter 131 with a predetermined space therebetween. The paper filter 132 is held by a front holding member 130A having a shape corresponding to the air outlet port 114, while the mesh filter 131 is held by a rear holding member 130B pivotally attached to the upper end portion of the rear surface of the lower holding member 130A via a hinge 133. The rear holding member 130B is provided with a frame member 130C framed in a substantially rectangular shape for holding the mesh filter 131. The front holding member 130A is provided with a gripping part 130D to be gripped at the time of attaching or detaching the filter member 130 to or from the dust collecting case 120. By drawing the filter member 130 with gripping the gripping part 130D, the filter member 130 can be detached from the dust collecting case 120.

Thereby, dust stored in the dust catch room 129 can be easily thrown away. Further, minute dust stored in the branched pipe 128 can be also thrown away. With such an arrangement, by taking out the filter member 130 from the dust collecting case 120, detaching away dust attached to the mesh filter 131 and the paper filter 132 and attaching the filter member 130 to the dust collecting case 120 again, the filter can be repeatedly used. Therefore, this cleaner is more economical than a cleaner of a type in which dust is caught in a disposable paper package.

The paper filter 132 is not limited to one having a substantially rectangular shape in a front view but it may be one having a substantially circular shape in a front view. In this case, the gripping part 130D may be connected to the central portion of the paper filter 132 so that, by rotating the gripping part 130D, the paper filter 132 can be rotated about its axis. In the case of such an arrangement, by providing a projection protruding on the locus of the peripheral portion of the rotating paper filter 132 and rotating the gripping part 130D, the end portions of a plurality of filter paper sheets provided on the paper filter 132 are struck against the projection to shake the filter paper sheets so that dust attached onto the filter paper can be shaken down. Thereby, clogging of the paper filter 132 can be eliminated.

In a state that the filter member 130 is detached from the dust collecting case 120, the rear holding member 130B can be pivotally moved rearward about the hinge 133 with respect to the front holding member 130A. Since the mesh filter 131 and the paper filter 132 are spaced from each other with a predetermined space, a room 148 is defined therebetween. By pivotally moving the rear holding member 130B with respect to the front holding member 130A, the room 148 can be opened. By opening the room 148 by pivotally moving the rear holding member 130B with respect to the front holding member 130A, disposing another filter behind the paper filter 132 and closing the rear holding member 130B, a filter other than the mesh filter 131 and the paper filter 132 can be provided in the room 148. As the abovementioned another filter, for example, a filter for exclusive use such as a urethane filer can be used or tissue paper sheets can be used. By providing another filter in the room 148 defined between the mesh filter 131 and a paper filter 132 as abovementioned, dust is hardly attached to the paper filter 132 and therefore the paper filter 132 can be easily maintained only by exchanging the abovementioned another filter.

The front end portion of the branched pipe 128 faces the upper end portion of the central portion in the lateral direction of the filter member 130. As shown with white arrows in FIG. 7, the air flowing from the guide member 124 into the dust catch room 129 passes the other portion of the filter member 130 than the portion faced by the branched pipe 128 to be discharged through the air outlet port 114. Rather large dust (larger dust) of dust contained in the air delivered from the dust catch room 129 toward the air outlet port 114 is caught by the mesh filter 131 to be stored in the dust catch room 129 while rather small dust (minute dust) having passed the mesh filter 131 is caught by the paper filter 132. On the other hand, the air led through the branched pipe 128 frontward is brought toward the upper portion of the filter member 130 from the front end potion of the branched pipe 128, and passes the mash filter 131 and the paper filter 132 to be discharged through the air outlet port 114.

The bottom surface of the dust collecting case 120 is opened and this opening 149 can be opened or closed by a lid 150 the front end portion of which is pivotally held by a hinge 133. In the lower portion of the rear surface of the dust collecting case 120, provided is a latching claw 145 for latching the rear end portion of the lid 150. The latching claw 145 is longitudinally pivotal about the central portion thereof. In a state that the latching claw 145 is vertically extended along the rear surface of the dust collecting case 120, a claw part 145A formed in the lower end portion thereof can be latched onto the rear end portion of the lid 150.

On the rear surface of the dust collecting case 120, an operating lever 146 to be operated for releasing the engagement of the latching claw 145 with the lid 150 is extended from the middle portion in the vertical direction to the lower end portion thereof. By pushing down the operating lever 146, the latching claw 145 is pivotally moved in the lower end portion of the operating lever 146 so that the engagement of the latching claw 145 with the lid 150 can be released. In a state that the latching claw 145 is disengaged, the lid 150 is pivotally movable about the hinge 133. By pivotally moving the lid 150 to open the opening 149, dust stored in the dust catch room 129 can be discharged through the opening 149.

In this modified embodiment, even if a large amount of dust is stored in the dust catch room 129 and the resistance becomes large at the time when air passes through the dust catch room 129, an air stream is ensured by the branched pipe 128. Therefore, the whole air stream passing through the dust collecting unit 110 can be maintained and the cleaning efficiency (power) is not lowered.

Further, since the mesh filter 127 provided in the connecting portion of the guide member 124 and the cylindrical filter 125 can prevent dust from flowing into the branched pipe 128, dust is not stored in the branched pipe 128 and air flow is not reduced there.

Further, the air flows from the upper portion down to the lower portion in the dust catch room 129, and dust flows with the air flow to be stored in the lower portion of the dust catch room 129. Therefore, dust is pushed down by the air from the upper portion in the dust catch room 129 and condensed so as not to become bulky.

Further, the air and dust taken in through the inlet port 112 flows mainly through the guide member 124 to enter the dust catch room 129. Since the air ports 126 of the branched pipe 128 are substantially in parallel with the direction of the air flow in the guide member 124, dust does not go through the air ports 126 into the branched pipe 128 but flows through the guide member 124 in which dust flows more easily. Further, since the mesh filters 127 are provided, dust is more surely prevented from entering the branched pipe 128. Only a sufficient amount of air to ensure air flow flows through the air ports 126 into the branched pipe 128.

Further, dust contained in the air flowing from the upper portion down to the lower portion in the dust catch room 129 is stored at the bottom of the dust catch room 129 by its own weight. The air passes the filter member 130 in the side portion and is discharged through the air outlet port 114. In the dust catch room 129, air flow can be ensured with dust being stored from the bottom portion thereof. Therefore, dust collecting power is not easily reduced.

Further, since dust hardly reaches the upper portion of the filter member 130 on the side surface, air passage for discharging the air flowing from the branched pipe 128 through the filter member 130 can be ensured.

Figure 11:
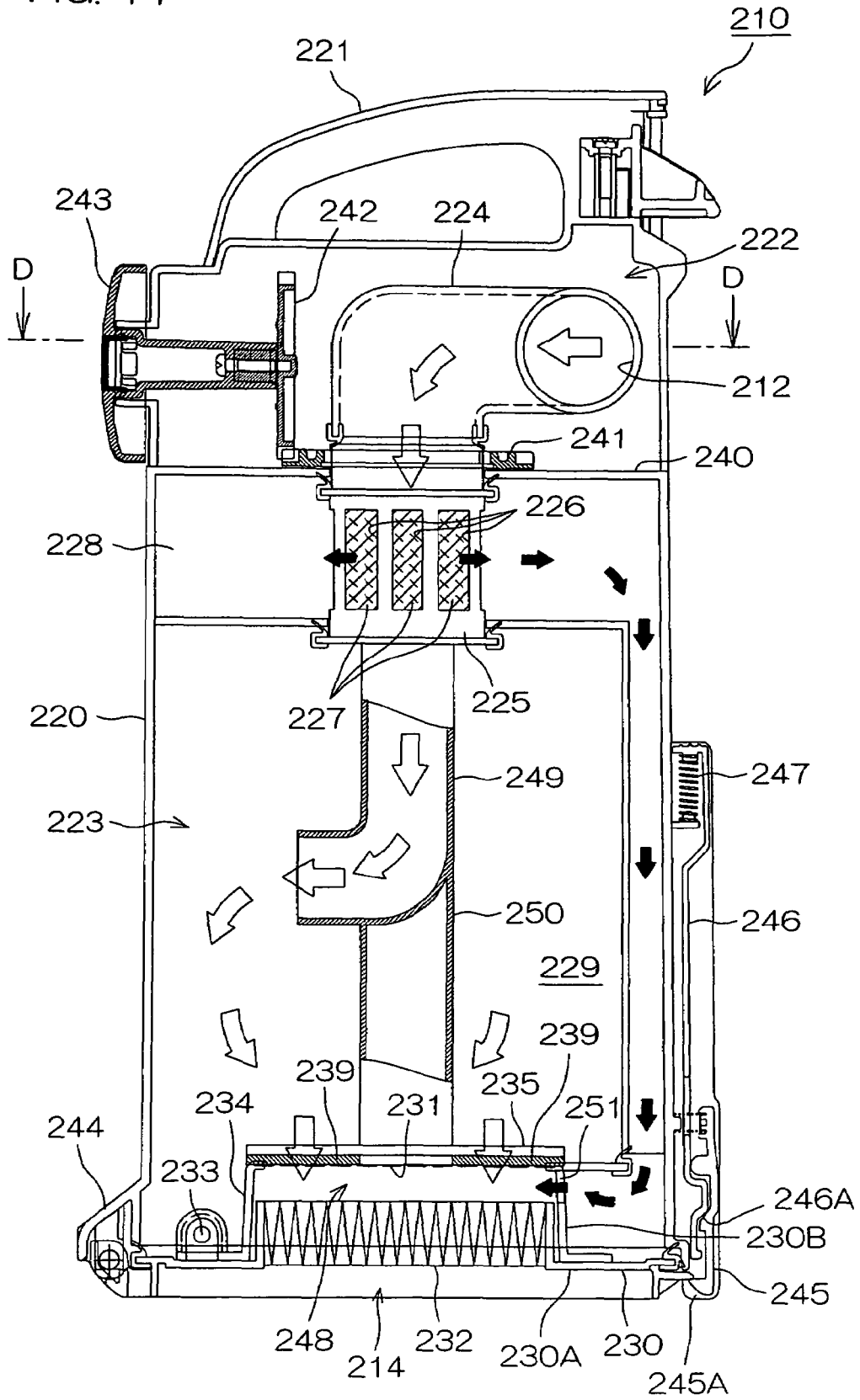
FIG. 11 is a sectional view of the dust collecting unit according to a second modified embodiment in which the dust collecting unit sectioned along a vertical plane in the longitudinal direction is seen from the left side.
Figure 12:
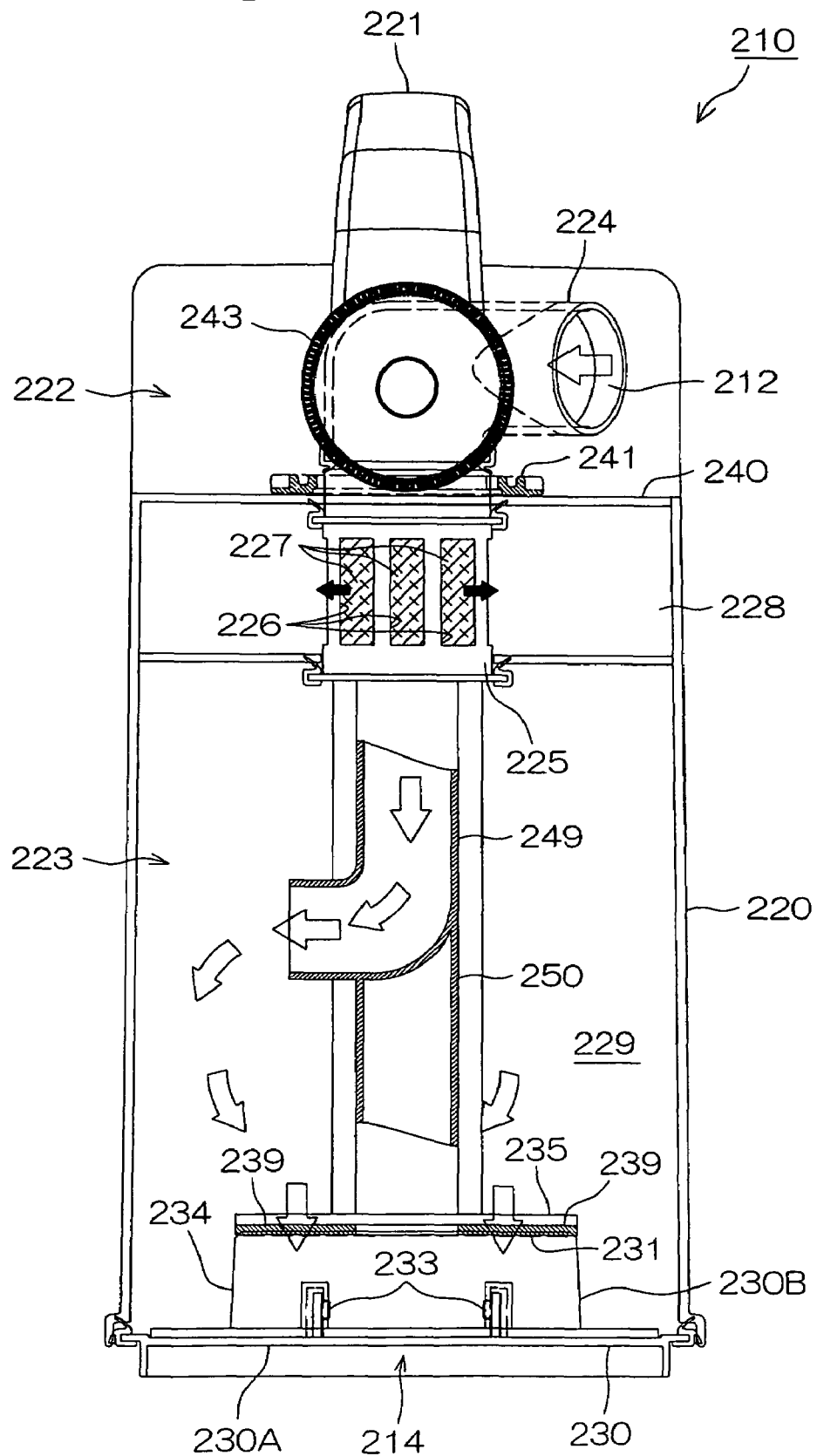
FIG. 12 is a rear view of the dust collecting unit according to a second modified embodiment.
Figure 13:
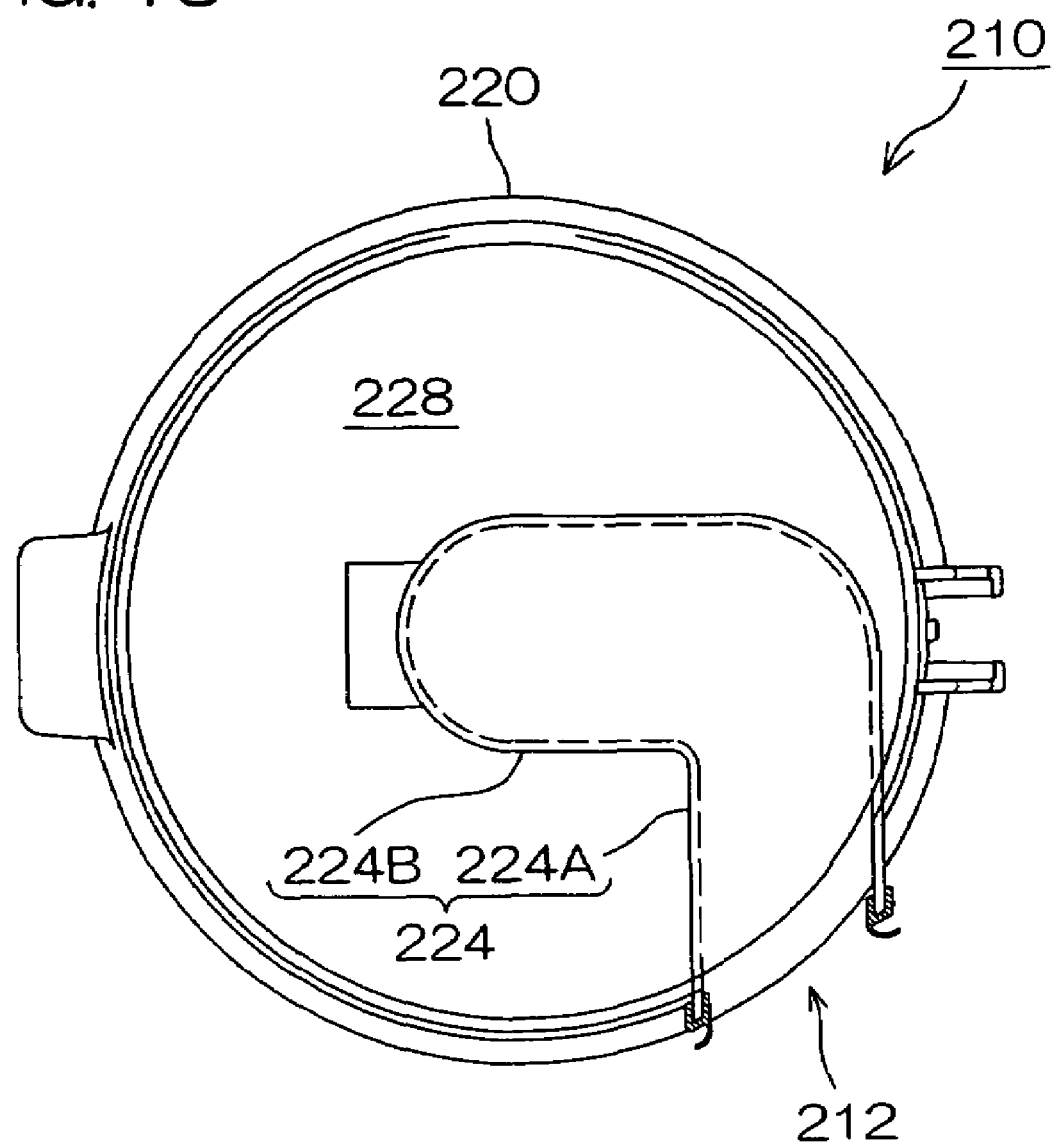
FIG. 13 is a sectional view of the dust collecting unit according to the second modified embodiment seen along the arrow D-D shown in FIG. 11.

FIG. 11 is a sectional view of a dust collecting unit 210 according to the second modified embodiment in which the dust collecting unit 210 sectioned along a vertical plane in the longitudinal direction is seen from the left side. FIG. 12 is a rear view of the dust collecting unit 210 according to the second modified embodiment with a part thereof being shown in a sectional view for simplification of the inner arrangement. FIG. 13 is a sectional view of the dust collecting unit 210 seen along the arrow D-D shown in FIG. 11.

Referring to FIGS. 11 to 13, the dust collecting unit 210 includes a substantially cylindrical dust collecting case 220 which defines the outline of the dust collecting unit 210. On the upper end portion of the dust collecting case 220, provided is a gripping part 221 which is gripped when the dust collecting case 220 is attached to or detached from the cleaner 1. The inside of the dust collecting case 220 is divided into an upper chamber 222 defined in the upper end portion thereof and a lower chamber 223 defined from the middle portion to the lower end portion thereof. An inlet port 212 is provided in the upper chamber 222, and the air taken in through the inlet port 212 is led in the direction of a tangential line of the outer circumferential surface of the dust collecting case 220 into the upper chamber 222.

In the upper chamber 222, provided is a horizontally elongated pipe-shaped guide member 224 one end of which is connected to the inlet port 212. More specifically, the guide member 224 has a substantially L-shaped form including a laterally elongated upstream side part 224A one end of which is connected to the inlet port 212 and a downstream side part 224B elongated rearward from the other end of the upstream side part 224A. The rear end portion of the downstream side part 224B is positioned on the central axis of the dust collecting case 220 and opens downwardly in the rear end portion (lower end portion) thereof. To the lower end portion of the guide member 224, connected is the upper end portion of a cylindrical filter 225 substantially in the form of a cylinder vertically elongated along the central axis of the dust collecting case 220. The cylindrical filter 225 is provided in its outer circumferential surface with a plurality of air holes 226, and each of the air holes 226 is covered with a mesh filter 227. The air hole 226 is opened in a direction substantially in parallel with the air stream in the cylindrical filter 225.

The air taken in through the inlet port 212 passes through the guide member 224 to be led downward, and led further downward through the cylindrical filter 225 as shown with white arrows in FIGS. 11 and 12, and a part of the air flows from the air holes 226 through the mesh filters 227 to be led out of the cylindrical filter 225 as shown with black arrows in FIGS. 11 and 12. On the other hand, dust contained in the air taken in through the inlet port 212, since being heavier than air, is caused to pass the cylindrical filter 225 by an inertia force (by its own weight) to be led downward. To the end portion of the cylindrical filter 225 connected is the upper end portion of a downward extended guide pipe 247. The lower end (distal end) of the guide pipe 249 is curved rearwardly in the central portion of the lower chamber 223 and opens rearward. However, the lower end portion of the guide pipe 249 may open in another direction (e.g. forward) in the horizontal direction or may open downward.

In the upper end portion of the lower chamber 223, a branched path 228 enclosing the outer circumferential surface of the cylindrical filter 225 is so defined as to extend in the horizontal direction. The air flowing from the air holes 226 through the mesh filer 227 out of the cylindrical filter 225 is led forward through the branched path 228. The branched path 228 extends downwardly from its front end portion along the front surface of the dust collecting case 220 to the bottom of the dust collecting case 220. A space outside the branched path 228 in the lower chamber 223 defines a dust catch room 229 for catching and storing dust discharged from the distal end of the guide member 224. In other words, a filter member 230 is provided in the bottom portion of the dust collecting case 220 (the lower chamber 223) When the air discharged from the guide pipe 249 goes downwardly and passes the filter member 230, dust contained in the air is caught by the filter member 230 to be stored in the dust catch room 229.

In this modified embodiment, the branched path 228 is so defined as to enclose the outside of the cylindrical filter 225 and disposed in a position away from the dust flow passage in the cylindrical filter 225. Therefore, dust contained in the air taken in through the inlet port 212 flows downward in the cylindrical filter 225, preventing the branched path 228 from hindering the dust flow in the cylindrical filter 225.

The bottom surface of the dust collecting case 220 is opened and the opening defines the air outlet port 214 for discharging the air from which dust has been caught. A filter member 230 is detachably attached to the lower end portion of the dust collecting case 220 so that it covers the air outlet opening 214. The filter member 230 includes a mesh filter 231 having a substantially circular shape in a plan view and facing the dust catch room 229, and a paper filter 232 having a substantially circular shape in a plan view and disposed below the mesh filter 231 with a predetermined space therebetween. The paper filter 232 is held by a lower holding member 230A having a shape corresponding to the air outlet port 214, while the mesh filter 231 is held by an upper holding member 230B pivotally attached to the rear end portion of the upper surface of the lower holding member 230A via a hinge 233. In the central portion of the upper holding member 230B, an upward protruded cylindrical part 234 is provided so as to enclose the outer circumference of the paper filer 232 held by the lower holding member 230A, and the mesh filter 231 is attached so as to cover the upper end opening of the cylindrical part 234.

In the lower portion of the guide pipe 249, formed is a pipe-shaped extended part 250 which is divided from the rearward curved part and extends further downward from the curved part along the central axis of the dust collecting case 220.

In the lower end portion of the extended part 250, a substantially circular flange part 235 is provided so as to be stretched in the diametrical direction and opposed to the upper end opening of the cylindrical part 234 provided on the upper holding member 230B of the filter member 230. The flange part 235 stretched from the lower end portion of the extended part 250 has the same structure as described with reference to FIG. 6 and includes an annular part 36 having a shape corresponding to the upper end face of the cylindrical part 234 of the filter member 230 and a plurality of (e.g. four) connecting parts 37 connecting the inner circumferential surface of the annular part 36 and the outer circumferential surface of the extended part 250.

The connecting parts 37 are respectively extended in the diametrical direction from the outer circumferential surface of the lower end portion of the extended part 250 respectively with a space of a predetermined angle (e.g. 90 degrees) therebetween. A plurality of (e.g. four) openings defined by the inner circumferential surface of the annular part 36 and the connecting parts 37 constitute air port 38 for passing the air flowing into the dust catch room 229 toward the filter member 230. In other words, as shown with white arrows in FIG. 11, the air flowing from the guide pipe 249 into the dust catch room 229 passes the air ports 38 to be led to the filter member 230, and passes the mesh filter 231 and the paper filter 232 to be discharged through the air outlet port 214. Rather large dust (larger dust) of the dust contained in the air delivered from the dust catch room 229 toward the air outlet port 214 is caught by the mesh filter 231 to be stored in the dust catch room 229, while rather small dust (minute dust) having passed the mesh filter 231 is caught by the paper filter 232.

In the upper portion of the front end of the cylindrical part 234 provided on the upper holding member 230B of the filter member 230, an airport 251 is provided. Through this air port 251, the distal end (lower end) of the branched path 228 is communicated with a room 248 defined between the mesh filter 231 and the paper filter 232. The air led through the branched path 228 downward flows from the lower end thereof through the air port 251 into the abovementioned room 248 and passes the paper filter 232 to be discharged through the air outlet port 214.

A brush member 239 (e.g. bristles) is attached to the lower surface of each connecting part 37 of the flange part 235. The distal end portions of these brush members 239 are in contact with the upper surface of the mesh filter 231. In this modified embodiment, the filter member 230 and the guide pipe 249 can be integrally rotated, and with this rotation, the distal end portions of the brush members 239 attached to the flange part 235 slidably contact the mesh filter 231. More specifically, the upper end portion of the cylindrical filter 225 penetrates a division wall 240 dividing the upper chamber 222 and the lower chamber 223 of the dust collecting case 220 to face the upper chamber 222. With the lower surface of the flange part 241 provided on the outer circumferential surface of the upper end portion of the cylindrical filter 225 contacting the upper surface of the division wall 240, the cylindrical filter 225 and the guide pipe 249 connected to the cylindrical filter 225 are rotatably held.

A plurality of teeth are provided on the outer peripheral edge of the upper surface of the flange part 235 provided on the upper end portion of the cylindrical filter 225. A gear 242 engageable with the teeth is provided in the upper chamber 222 of the dust collecting case 220. A shaft of the gear 242 is extended in the longitudinal direction and is connected to a dial 243 stretched outward from the rear end of the circumferential surface of the dust collecting case 220. When the dial 43 is rotated, the flange part 235 is rotated via the gear 242, and the cylindrical filer 225 and the guide pipe 228 are rotated. Thereby, the flange part 235 provided on the lower portion of the extended part 250 of the guide pipe 249 is rotated, and the distal end portion of the brush member 239 attached to the flange part 235 slidably contacts the mesh filter 231 so that dust attached to the upper surface of the mesh filter 231 can be detached and the clogging of the mesh filter 231 can be eliminated.

In the lower portion of the rear end portion of the dust collecting case 220, provided is a latching part 244 for latching the rear end portion of the filter member 230 (lower holding member 230A). On the other hand, in the front end portion of the lower portion of the outer circumferential surface of the dust collecting case 220, provided is a latching claw 245 for latching the front end portion of the filter member 230 (lower holding member 230A). The latching claw 245 is longitudinally pivotally movable about the upper end portion thereof. In a state that the latching claw 245 is vertically extended along the outer circumferential surface of the dust collecting case 220, a claw part 245A formed in the lower end portion thereof can be latched onto the front end portion of the filter member 230.

On the front end portion of the outer surface of the dust collecting case 220, an operating lever 246 is extended from the middle portion in the vertical direction to the lower end portion thereof. The operating lever 246 is operated for releasing the engagement of the latching claw 245 with the filter member 230. The lower end portion of the operating lever 246 is inserted between the outer circumferential surface of the dust collecting case 220 and the latching claw 245. The operating lever 246 is urged upward by a spring 247 provided at the upper end potion thereof. By pushing down the operating lever 246 against the urging force of the spring 247, the latching claw 245 is pushed forward by an inclined surface 246A provided in the lower end portion of the operating lever 246 so that the engagement of the latching claw 245 with the filter member 230 can be released. In a state that the latching claw 245 is disengaged, the filter member 230 can be detached from the dust collecting case 220.

By detaching the filter member 230 from the dust collecting case 220, the air outlet port 214 is opened and dust stored in the dust catch room 229 can be easily thrown away through the air outlet port 214. Further, minute dust stored in the branched path 228 can be also thrown away. With such an arrangement, by taking out the filter member 230 from the dust collecting case 220, detaching away dust attached to the mesh filter 231 and the paper filter 232 and attaching the filter member 230 to the dust collecting case 220 again, the filter can be repeatedly used. Therefore, this cleaner is more economical than a cleaner of a type in which dust is caught in a disposable paper package.

In a state that the filter member 230 is detached from the dust collecting case 220, the upper holding member 230B can be pivotally moved upward about the hinge 233 with respect to the lower holding member 230A. Since the mesh filter 231 and the paper filter 232 are spaced from each other with a predetermined space, a room 248 is defined therebetween. By pivotally moving the upper holding member 230B with respect to the lower holding member 230A, the room 248 can be opened. By opening the room 248 by pivotally moving the upper holding member 230B with respect to the lower holding member 230A, disposing another filter above the paper filter 232 and closing the upper holding member 230B, a filter other than the mesh filter 231 and the paper filter 232 can be provided in the room 248. As the abovementioned another filter, for example, a filter for exclusive use such as a urethane filer can be used or tissue paper sheets can be used. By providing another filter in the room 248 defined between the mesh filter 231 and a paper filter 232 as mentioned above, dust is hardly attached to the paper filter 232 and therefore the paper filter 232 can be easily maintained only by exchanging the abovementioned another filter.

In this modified embodiment, even if a large amount of dust is stored in the dust catch room 229 and the resistance becomes large at the time when air passes through the dust catch room 229, an air stream is ensured by the branched path 228. Therefore, the whole air stream passing through the dust collecting unit 210 can be maintained and the cleaning efficiency (power) is not lowered.

Further, since the mesh filter 227 provided in the connecting portion of the guide member 224 and the cylindrical filter 225 can prevent dust from flowing into the branched path 228, dust is not stored in the branched path 228 and air flow is not reduced there.

Further, the air flows from the upper portion down to the lower portion in the dust catch room 229, and dust flows with the air flow and is stored in the lower portion of the dust catch room 229. Therefore, dust is pushed down by the air from the upper portion in the dust catch room 229 and condensed so as not to become bulky.

Further, the air and dust taken in through the inlet port 212 flows mainly through the cylindrical filter 225 to enter the dust catch room 229. Since the air ports 226 of the branched path 228 are substantially in parallel with the direction of the air flow in the cylindrical filter 225, dust does not go through the air ports 226 into the branched path 228 but flows through the cylindrical filter 225 in which dust flows more easily. Further, since the mesh filters 227 are provided, dust is more surely prevented from entering the branched path 228. Only a sufficient amount of air to ensure air flow flows through the air ports 226 into the branched path 228.

Further, since the air flowing from the upper portion down to the lower portion in the dust catch room 229 passes straight the filter member 230 in the lower portion and is discharged downward through the air outlet port 214, the air flow in the dust catch room 229 is simple and the power is not reduced.

Further, since the direction of the air flow in the branched path 228 is the same with that of the air flow in the dust catch room 229, the air flows smoothly and the power is not reduced.

Furthermore, since the outlet of the branched path 228 faces a portion of the filter member 230 the position of which is different from the position of a portion of the filter member 230 through which the air having passed through the dust catch room 229 passes, the air flow flowing from the branched path 228 through the filter member 230 to the air outlet port 214 can be ensured even if a large amount of dust is stored on this side of the filter member 230.

Figure 14:
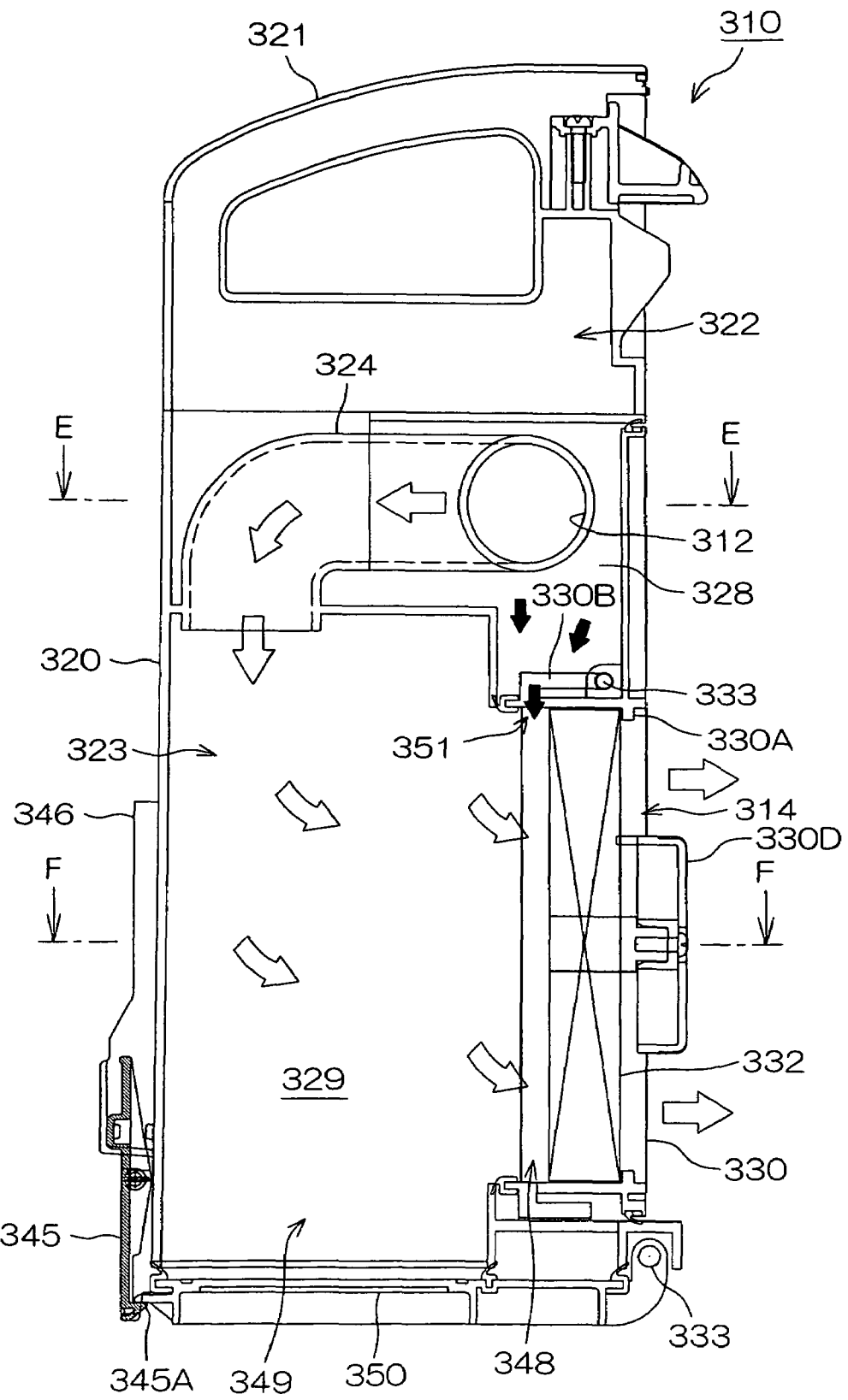
FIG. 14 is a sectional view of the dust collecting unit according to a third modified embodiment in which the dust collecting unit sectioned along a vertical plane in the longitudinal direction is seen from the left side.
Figure 15:
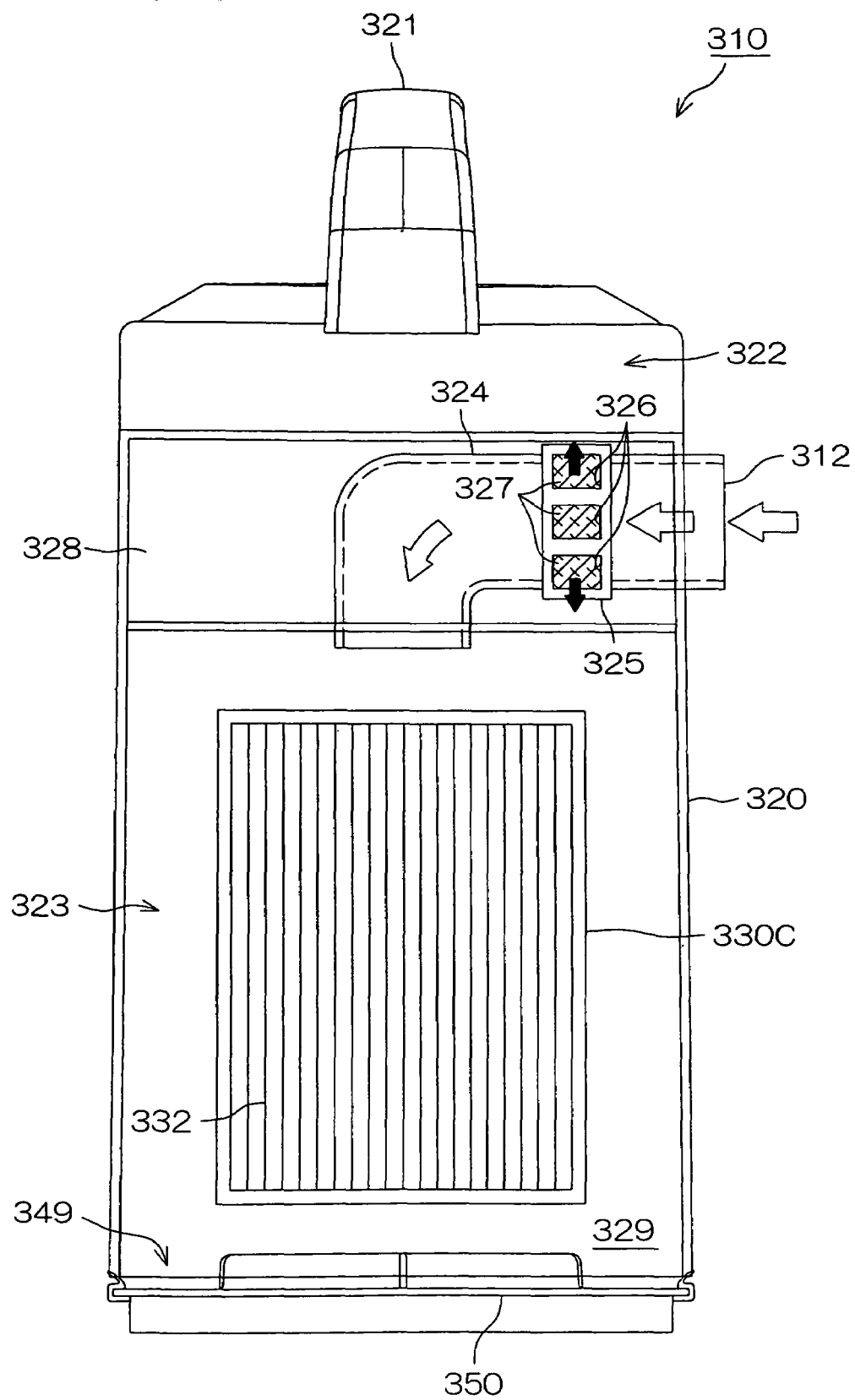
FIG. 15 is a rear view of the dust collecting unit according to the third modified embodiment.
Figure 16:
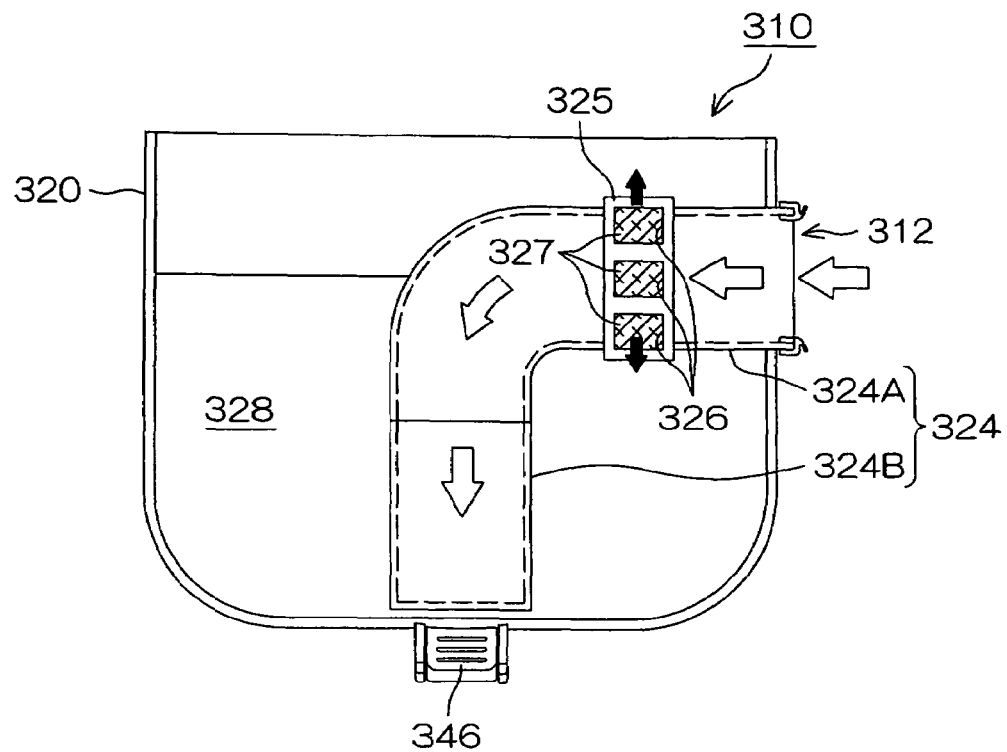
FIG. 16 is a sectional view of the dust collecting unit according to the third modified embodiment seen along the arrow E-E shown in FIG. 14.
Figure 17:
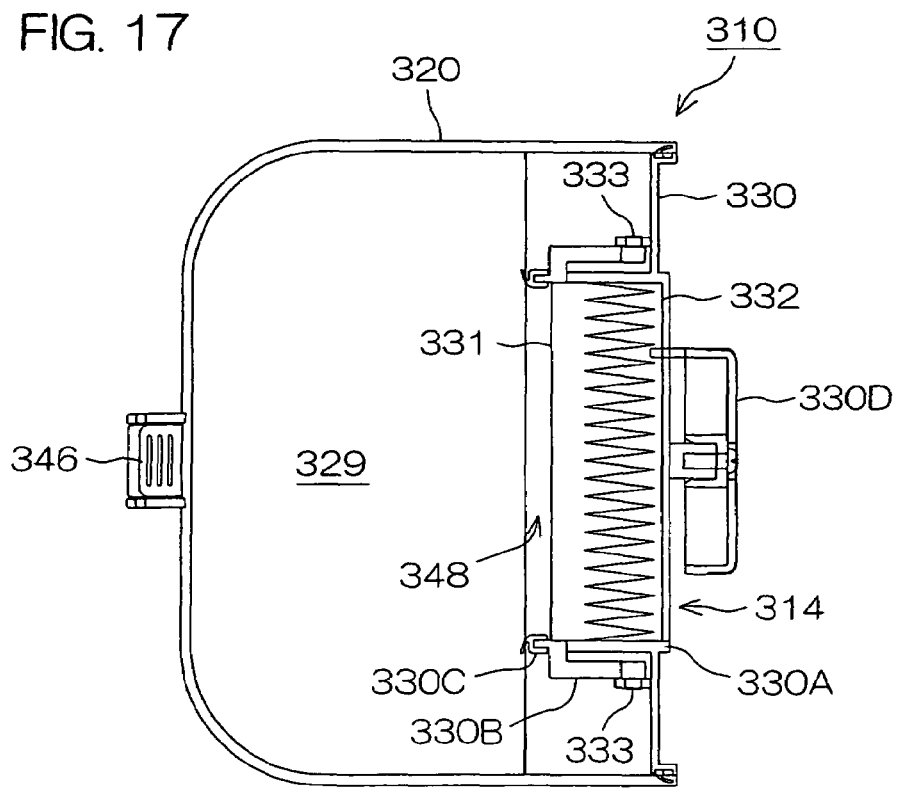
FIG. 17 is a sectional view of the dust collecting unit according to the third modified embodiment seen along the arrow F-F shown in FIG. 14.

FIG. 14 is a sectional view of a dust collecting unit 310 according to the third modified embodiment in which the dust collecting unit 310 sectioned along a vertical plane in the longitudinal direction is seen from the left side. FIG. 15 is a rear view of the dust collecting unit 310 according to the third modified embodiment with a part thereof being shown in a sectional view for simplification of the inner arrangement. FIG. 16 is a sectional view of the dust collecting unit 310 according to the third modified embodiment seen along the arrow E-E shown in FIG. 14. FIG. 17 is a sectional view of the dust collecting unit 310 according to the third embodiment seen along the arrow F-F shown in FIG. 14.

Referring to FIGS. 14 to 17, the dust collecting unit 310 includes a dust collecting case 320 having a substantially rectangular shape in a plan view and defining the outline of the dust collecting unit 310. On the upper end portion of the dust collecting case 320, provided is a gripping part 321 which is gripped when the dust collecting case 320 is attached to or detached from the cleaner 1. The inside of the dust collecting case 320 is divided into an upper chamber 322 defined in the upper end portion thereof and a lower chamber 323 defined from the middle portion to the lower end portion thereof. An inlet port 312 is provided in the left surface of the dust collecting case 320 and directed in the lateral direction to face the upper end portion of the lower chamber 323.

In the upper portion of the lower chamber 323, provided is a horizontally elongated pipe-shaped guide member 324 one end of which is connected to the inlet port 312. More specifically, the guide member 324 has a substantially L-shaped form including a laterally elongated upstream side part 324A one end of which is connected to the inlet port 312 and a downstream side part 324B elongated rearward from the other end of the upstream side part 324A. The rear end portion of the downstream side part 324B is positioned in the rear end portion of the dust collecting case 320, and is opened downward at the rear end portion (lower end portion). On the way of the upstream side part 324A of the guide member 324, interposed is a cylindrical filter 325 substantially in the form of a cylinder. The cylindrical filter 325 is provided in its outer circumferential surface with a plurality of air holes 326, each of which is covered with a mesh filter 327. The air hole 326 is opened in a direction substantially in parallel with the air stream in the cylindrical filter 325.

The air taken in through the inlet port 312 passes through the guide member 324 to be led to the distal end of the downstream side part 324B as shown with white arrows in FIGS. 14 and 16, and a part of the air flows from the air holes 326 through the mesh filters 327 to be led out of the cylindrical filter 325 as shown with black arrows in FIGS. 15 and 16. On the other hand, dust contained in the air taken in through the inlet port 312, since being heavier than air, is caused to pass the cylindrical filter 325 by an inertia force to be led to the distal end of the downstream side part 324B.

In the upper end portion of the lower chamber 323, a branched path 228 enclosing the outer circumferential surface of the guide member 324 is so defined as to extend in the horizontal direction. The air flowing from the air holes 326 through the mesh filer 327 out of the cylindrical filter 325 is led through the branched path 328 downward from the front end thereof. A space outside the branched path 328 in the lower chamber 323 defines a dust catch room 329 for catching and storing dust discharged from the distal end of the guide member 324. In other words, a filter member 330 is provided on the front surface of the dust collecting case 320 (the lower chamber 323). When the air discharged from the guide member 324 goes forward and passes the filter member 330, dust contained in the air is caught by the filter member 330 to be stored in the dust catch room 329.

In this modified embodiment, the branched path 328 is so defined as to enclose the outside of the guide member 324 and the cylindrical filter 325 and disposed in a position away from the dust flow passage in the cylindrical filter 325. Therefore, dust contained in the air taken in through the inlet port 312 flows rearward in the cylindrical filter 325, preventing the branched path 328 from hindering the dust flow in the cylindrical filter 325.

The front surface of the dust collecting case 320 is provided with a substantially rectangular opening, and the opening defines the air outlet port 314 for discharging the air from which dust has been caught. A filter member 330 is detachably attached to the front end portion of the dust collecting case 320 so that it covers the air outlet port 314. The filter member 330 includes a mesh filter 331 having a substantially rectangular shape in a front view and facing the dust catch room 329, and a paper filter 332 having a substantially rectangular shape in a front view and disposed in front of the mesh filter 331 with a predetermined space therebetween. The paper filter 332 is held by a front holding member 330A having a shape corresponding to the air outlet port 314, while the mesh filter 331 is held by an rear holding member 330B pivotally attached to the upper end portion of the rear surface of the front holding member 330A via a hinge 333. The front holding member 330A is provided with a gripping part 330D to be gripped at the time of attaching or detaching the filter member 330 to or from the dust collecting case 320. By drawing the filter member 330 with gripping the gripping part 330D, the filter member 330 can be detached from the dust collecting case 320.

Thereby, dust stored in the dust catch room 329 can be easily thrown away. Further, minute dust stored in the branched pipe 28 can be also thrown away. With such an arrangement, by taking out the filter member 330 from the dust collecting case 320, detaching dust attached to the mesh filter 331 and the paper filter 332 and attaching the filter member 330 to the dust collecting case 320 again, the filter can be repeatedly used. Therefore, this cleaner is more economical than a cleaner of a type in which dust is caught in a disposable paper package.

The paper filter 332 is not limited to one having a substantially rectangular shape in a front view, but it may be one having a substantially circular shape in a front view. In this case, the gripping part 330D may be connected to the central portion of the paper filter 332 so that, by rotating the gripping part 330D, the paper filter 332 can be rotated about its axis. In the case of such an arrangement, by providing a projection protruding on the locus of the peripheral portion of the rotating paper filter 332 and rotating the gripping part 330D, the end portions of a plurality of filter paper sheets provided on the paper filter 332 are struck against the projection to shake the filter paper sheets so that dust attached onto the filter paper can be shaken down. Thereby, clogging of the paper filter 332 can be eliminated.

In a state that the filter member 330 is detached from the dust collecting case 320, the rear holding member 330B can be pivotally moved rearward about the hinge 333 with respect to the front holding member 330A. Since the mesh filter 331 and the paper filter 332 are spaced from each other with a predetermined space, a room 348 is defined therebetween. By pivotally moving the rear holding member 330B with respect to the front holding member 330A, the room 348 can be opened. By opening the room 348 by pivotally moving the rear holding member 330B with respect to the front holding member 330A, disposing another filter behind the paper filter 332 and closing the rear holding member 330B, a filter other than the mesh filter 331 and the paper filter 332 can be provided in the room 348. As the abovementioned another filter, for example, a filter for exclusive use such as a urethane filter can be used or tissue paper sheets can be used. By providing another filter in the room 348 defined between the mesh filter 331 and a paper filter 332 as mentioned above, dust is hardly attached to the paper filter 332 and therefore the paper filter 332 can be easily maintained only by exchanging abovementioned another filter.

As shown with white arrows in FIG. 14, the air flowing from the guide member 324 into the dust catch room 329 passes the filter member 330 to be discharged through the air outlet port 314. Rather large dust (larger dust) of dust contained in the air delivered from the dust catch room 329 toward the air outlet port 314 is caught by the mesh filter 331 to be stored in the dust catch room 329 while rather small dust (minute dust) having passed the mesh filter 331 is caught by the paper filter 332.

In the upper portion of the front holding member 330A of the filter member 330, an airport 351 is provided. Through this air port 351, the lower portion of the front end portion of the branched path 328 is communicated with a room 348 defined between the mesh filter 331 and the paper filter 332. The air led through the branched path 328 flows from the lower portion of the front end thereof through the air port 351 into the abovementioned room 348 and passes the paper filter 332 to be discharged through the air outlet port 314.

The bottom surface of the dust collecting case 320 is opened, and this opening 349 can be opened or closed by a lid 350 the front end portion of which is pivotally held by a hinge 333. In the lower portion of the rear surface of the dust collecting case 320, provided is a latching claw 345 for latching the rear end portion of the lid 350. The latching claw 345 is longitudinally pivotal about the central portion thereof. In a state that the latching claw 345 is vertically extended along the rear surface of the dust collecting case 320, a claw part 345A formed in the lower end portion thereof can be latched onto the rear end portion of the lid 350.

On the rear surface of the dust collecting case 320, an operating lever 346 to be operated for releasing the engagement of the latching claw 345 with the lid 350 is extended from the middle portion in the vertical direction to the lower end portion thereof. By pushing down the operating lever 346, the latching claw 345 is pivotally moved in the lower end portion of the operating lever 346 so that the engagement of the latching claw 345 with the lid 350 can be released. While the latching claw 345 is disengaged, the lid 350 is pivotally movable about the hinge 333. By pivotally moving the lid 350 to open the opening 349, dust stored in the dust catch room 329 can be discharged through the opening 349.

In this modified embodiment, even if a large amount of dust is stored in the dust catch room 329 and the resistance becomes large at the time when air passes through the dust catch room 329, an air stream is ensured by the branched path 328. Therefore, the whole air stream passing through the dust collecting unit 310 can be maintained and the cleaning efficiency (power) is not lowered.

Further, since the mesh filter 327 provided in the connecting portion of the guide member 324 and the cylindrical filter 325 can prevent dust from flowing into the branched path 328, dust is not stored in the branched path 328 and air flow is not reduced there.

Further, the air flows from the upper portion down to the lower portion in the dust catch room 329, and dust flows with the air flow and is stored in the lower portion of the dust catch room 329. Therefore, dust is pushed down by the air from the upper portion in the dust catch room 329 and condensed so as not to become bulky.

Further, the air and dust taken in through the inlet port 312 flows mainly through the cylindrical filter 325 to enter the dust catch room 329. Since the air ports 326 of the branched path 328 are substantially in parallel with the direction of the air flow in the cylindrical filter 325, dust does not go through the air ports 326 into the branched path 328 but flows through the cylindrical filter 325 in which dust flows more easily. Further, since the mesh filters 327 are provided, dust is more surely prevented from entering the branched path 328. Only a sufficient amount of air to ensure air flow flows through the air ports 326 into the branched path 328.

Further, dust contained in the air flowing from the upper portion down to the lower portion in the dust catch room 329 is stored at the bottom of the dust catch room 329 by its own weight. The air passes the filter member 330 in the side portion and is discharged through the air outlet port 314. In the dust catch room 329, air flow can be ensured with dust being stored from the bottom portion thereof. Therefore, dust collecting power is not reduced.

Further, since dust hardly reaches the upper portion of the filter member 330 on the side surface, air passage for discharging the air flowing from the branched path 328 through the filter member 330 can be ensured.

Figure 18:
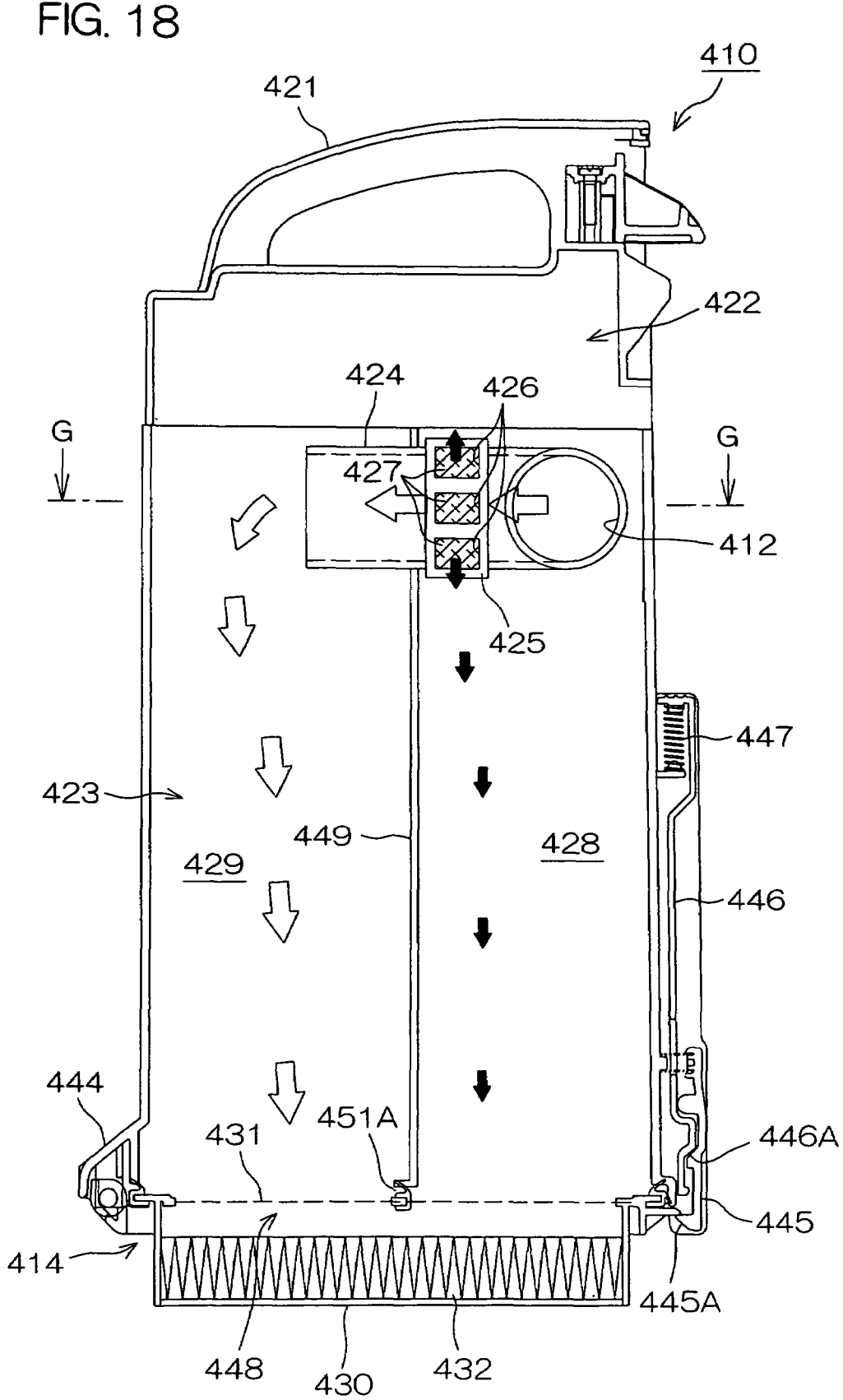
FIG. 18 is a sectional view of the dust collecting unit according to a fourth modified embodiment in which the dust collecting unit sectioned along a vertical plane in the longitudinal direction is seen from the left side.
Figure 19:
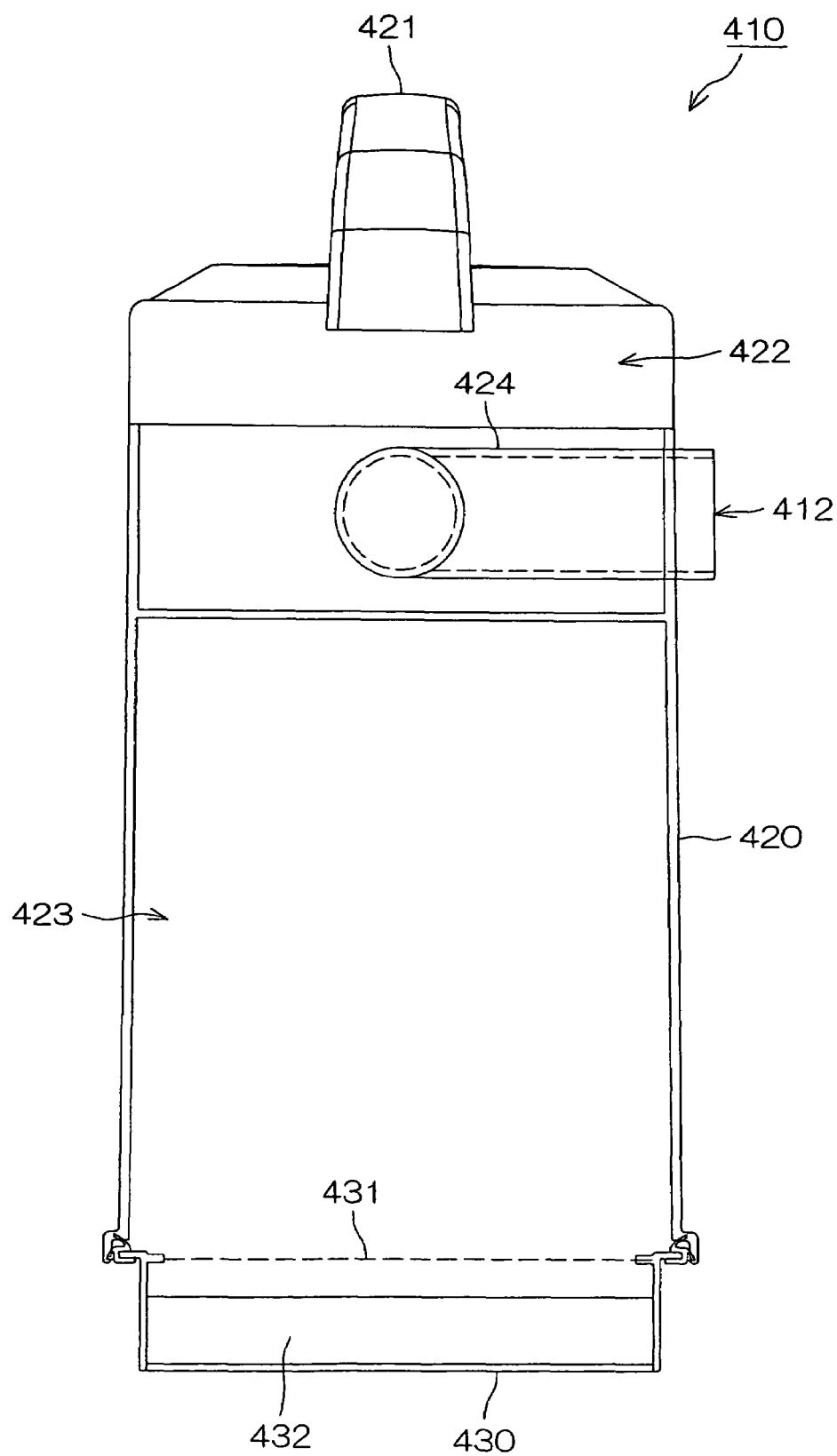
FIG. 19 is a rear view of the dust collecting unit according to the fourth modified embodiment.
Figure 20:
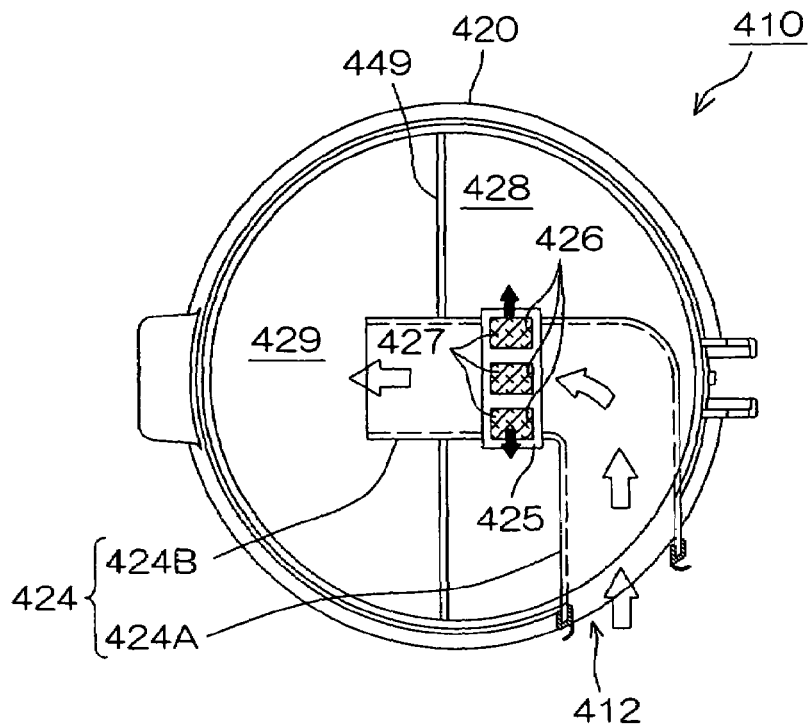
FIG. 20 is a sectional view of the dust collecting unit according to the fourth modified embodiment seen along the arrow G-G shown in FIG. 18.

FIG. 18 is a sectional view of a dust collecting unit 410 according to the fourth modified embodiment in which the dust collecting unit 410 sectioned along a vertical plane in the longitudinal direction is seen from the left side. FIG. 19 is a rear view of the dust collecting unit 410 according to the fourth modified embodiment with a part thereof being shown in a sectional view for simplification of the inner arrangement. FIG. 20 is a sectional view of the dust collecting unit 410 seen along the arrow G-G shown in FIG. 18.

Referring to FIGS. 18 to 20, the dust collecting unit 410 includes a substantially cylindrical dust collecting case 420 which defines the outline of the dust collecting unit 410. On the upper end portion of the dust collecting case 420, provided is a gripping part 421 which is gripped when the dust collecting case 420 is attached to or detached from the cleaner 1. The inside of the dust collecting case 420 is divided into an upper chamber 422 defined in the upper end portion thereof and a lower chamber 423 defined from the middle portion to the lower end portion thereof. An inlet port 412 is provided in the upper chamber 422 and the air taken in through the inlet port 412 is led in the direction of a tangential line of the outer circumferential surface of the dust collecting case 420 into the upper chamber 422.

In the upper portion of the lower chamber 423, provided is a horizontally elongated pipe-shaped guide member 424 one end of which is connected to the inlet port 412. More specifically, the guide member 424 has a substantially L-shaped form including a laterally elongated upstream side part 424A one end of which is connected to the inlet port 412 and a downstream side part 424B elongated rearward from the other end of the upstream side part 424A. The rear end portion of the downstream side part 424B is positioned on the axis line of the dust collecting case 420, and is opened rearward at the rear end portion thereof. On the way of the downstream side part 424B of the guide member 424, a cylindrical filter 425 substantially in the form of a cylinder is interposed. The cylindrical filter 425 is provided with a plurality of air holes 426 in its outer circumferential surface, each of which is covered with a mesh filter 427. The air holes 426 are opened in a direction substantially in parallel with the air stream in the cylindrical filter 425.

The air taken in through the inlet port 412 passes through the guide member 424 to be led through the cylindrical filter 425 to the distal end of the downstream side part 424B as shown with white arrows in FIGS. 18 and 20, and a part of the air flows from the air holes 426 through the mesh filters 427 to be led out of the cylindrical filter 425 as shown with black arrows in FIGS. 18 and 20. On the other hand, dust contained in the air taken in through the inlet port 412, since being heavier than air, is caused to pass the cylindrical filter 425 by an inertia force to be led to the distal end of the downstream side part 424B.

The lower chamber 423 is divided into two rooms, namely, a front room and a rear room by a division wall 449 extending in the lateral direction. The rear room of these two rooms constitutes a dust catch room 429 for catching and storing dust discharged from the distal end of the guide member 424, while the front room constitutes a branched path 428 enclosing the outside of the cylindrical filter 425. The air flowing from the air holes 426 through the mesh filer 427 out of the cylindrical filter 425 is led downward through the branched path 428. A filter member 430 is provided in the bottom portion of the dust collecting case 420 (the lower chamber 423). When the air discharged from the guide member 424 goes downward and passes the filter member 430, dust contained in the air is caught by the filter member 430 to be stored in the dust catch room 429.

In this modified embodiment, the branched path 428 is so defined as to enclose the outside of the cylindrical filter 425 and disposed in a position away from the dust flow passage in the cylindrical filter 425. Therefore, dust contained in the air taken in through the inlet port 412 flows rearward in the cylindrical filter 425, and the branched path 428 can be prevented from hindering the dust flow in the cylindrical filter 425.

Figure 21:
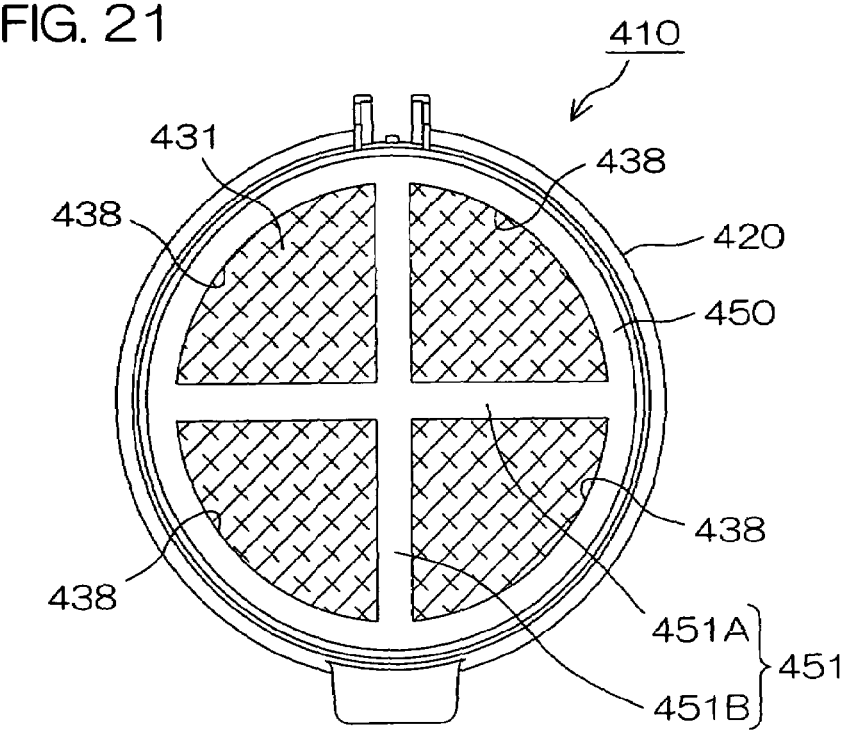
FIG. 21 is a plan view of a filter member according to the fourth modified embodiment.

The bottom surface of the dust collecting case 420 is opened and the opening defines the air outlet port 414 for discharging the air from which dust has been caught. A filter member 430 is detachably attached to the lower end portion of the dust collecting case 420 so that it covers the air outlet opening 414. The filter member 430 includes a mesh filter 431 having a substantially circular shape in a plan view and facing the dust catch room 429 and the branched path 428, and a paper filter 432 having a substantially circular shape in a plan view and disposed below the mesh filter 431 with a predetermined space therebetween. FIG. 21 is a plan view of the filter member 430. As shown in this figure, in the upper end portion of the filter member 430, an annular part 450 and a connecting part 451 bridged substantially in the shape of a cross onto the inner circumferential surface of the annular part 450. The connecting part 451 includes a lateral connecting portion 451A elongated in the lateral direction and a longitudinal connecting portion 451B elongated in the longitudinal direction. A plurality of (e.g. four) openings defined by the inner circumferential surface of the annular part 450 and the connecting part 451 constitutes air ports 438.

In a state that the filter member 430 is attached to the dust collecting case 420, the lower end surface of the division wall 449 contacts the upper surface of the lateral connection portion 451A. Thereby, the air flowing into the dust catch room 429 flows through two air ports 438 on the rear side among the four air ports 438 into the filter member 430, while the air flowing into the branched path 428 flows through two air ports 438 on the front side among the four air ports 438. Rather large dust (larger dust) of the dust contained in the air delivered from the dust catch room 429 toward the air outlet port 414 is caught by the mesh filter 431 to be stored in the dust catch room 429, while rather small dust (minute dust) having passed the mesh filter 431 is caught by the paper filter 432.

In the lower portion of the rear end portion of the dust collecting case 420, provided is a latching part 444 for latching the rear end portion of the filter member 430. On the other hand, in the front end portion of the lower portion of the outer circumferential surface of the dust collecting case 420, provided is a latching claw 445 for latching the front end portion of the filter member 430. The latching claw 445 is longitudinally pivotally movable about the upper end portion thereof. In a state that the latching claw 445 is vertically extended along the outer circumferential surface of the dust collecting case 420, a claw part 445A formed in the lower end portion thereof can be latched onto the front end portion of the filter member 430.

On the front end portion of the outer surface of the dust collecting case 420, an operating lever 446 is extended from the middle portion in the vertical direction to the lower end portion thereof. The operating lever 446 is operated for releasing the engagement of the latching claw 445 with the filter member 430. The lower end portion of the operating lever 446 is inserted between the outer circumferential surface of the dust collecting case 420 and the latching claw 445. The operating lever 446 is urged upward by a spring 447 provided at the upper end potion thereof. By pushing down the operating lever 446 against the urging force of the spring 447, the latching claw 445 is pushed forward by an inclined surface 446A provided in the lower end portion of the operating lever 446 so that the engagement of the latching claw 445 with the filter member 430 can be released. In a state that the latching claw 445 is disengaged, the filter member 430 can be detached from the dust collecting case 420.

By detaching the filter member 430 from the dust collecting case 420, the air outlet port 414 is opened and dust stored in the dust catch room 429 can be easily thrown away through the air outlet port 414. Further, minute dust stored in the branched path 428 can be also thrown away. With such an arrangement, by taking out the filter member 430 from the dust collecting case 420, detaching away dust attached to the mesh filter 431 and the paper filter 432 and attaching the filter member 430 to the dust collecting case 420 again, the filter can be repeatedly used. Therefore, this cleaner is more economical than a cleaner of a type in which dust is caught in a disposable paper package.

If another filter is disposed above the filter member 430 (mesh filter 431) at the time of attaching the filter member 430 to the dust collecting case 420, a filter other than the mesh filter 431 and the paper filter 432 can be held between the upper surface of the division wall 449 and the upper surface of the filter member 430. As the abovementioned another filter, for example, a filter for exclusive use such as a urethane filer can be used or tissue paper sheets can be used. By providing another filter above the filter member 430, dust is hardly attached to the filter member 430 (the mesh filter 431 and the paper filter 432). Therefore, the paper filter 432 can be easily maintained only by exchanging the abovementioned another filter.

In this modified embodiment, even if a large amount of dust is stored in the dust catch room 429 and the resistance becomes large at the time when air passes through the dust catch room 429, an air stream is ensured by the branched path 428. Therefore, the whole air stream passing through the dust collecting unit 410 can be maintained and the cleaning efficiency (power) is not lowered.

Further, since the mesh filter 427 provided in the connecting portion of the branched path 428 and the cylindrical filter 425 can prevent dust from flowing into the branched path 428, dust is not stored in the branched path 428 and air flow is not reduced there.

Further, the air flows from the upper portion down to the lower portion in the dust catch room 429, and dust flows with the air flow and is stored in the lower portion of the dust catch room 429. Therefore, dust is pushed down by the air from the upper portion in the dust catch room 429 and condensed so as not to become bulky.

Further, the air and dust taken in through the inlet port 412 flows mainly through the cylindrical filter 425 to enter the dust catch room 429. Since the air ports 426 of the branched path 428 are substantially in parallel with the direction of the air flow in the cylindrical filter 425, dust does not go through the air ports 426 into the branched path 428 but flows through the cylindrical filter 425 in which dust flows more easily. Further, since the mesh filters 427 are provided, dust is more surely prevented from entering the branched path 428. Only a sufficient amount of air to ensure air flow flows through the air ports 426 into the branched path 428.

Further, since the air flowing from the upper portion down to the lower portion in the dust catch room 429 passes straight the filter member 430 in the lower portion and is discharged downward through the air outlet port 414, the air flow in the dust catch room 429 is simple and the power is not reduced.

Further, since the direction of the air flow in the branched path 428 is the same with that of the air flow in the dust catch room 429, the air flows smoothly and the power is not reduced.

Furthermore, since the outlet of the branched path 428 faces a portion of the filter member 430 the position of which is different from the position of a portion of the filter member 430 through which the air having passed through the dust catch room 429 passes, the air flow flowing from the branched path 428 through the filter member 230 to the air outlet port 414 can be ensured even if a large amount of dust is stored on this side of the filter member 430.

Figure 22:
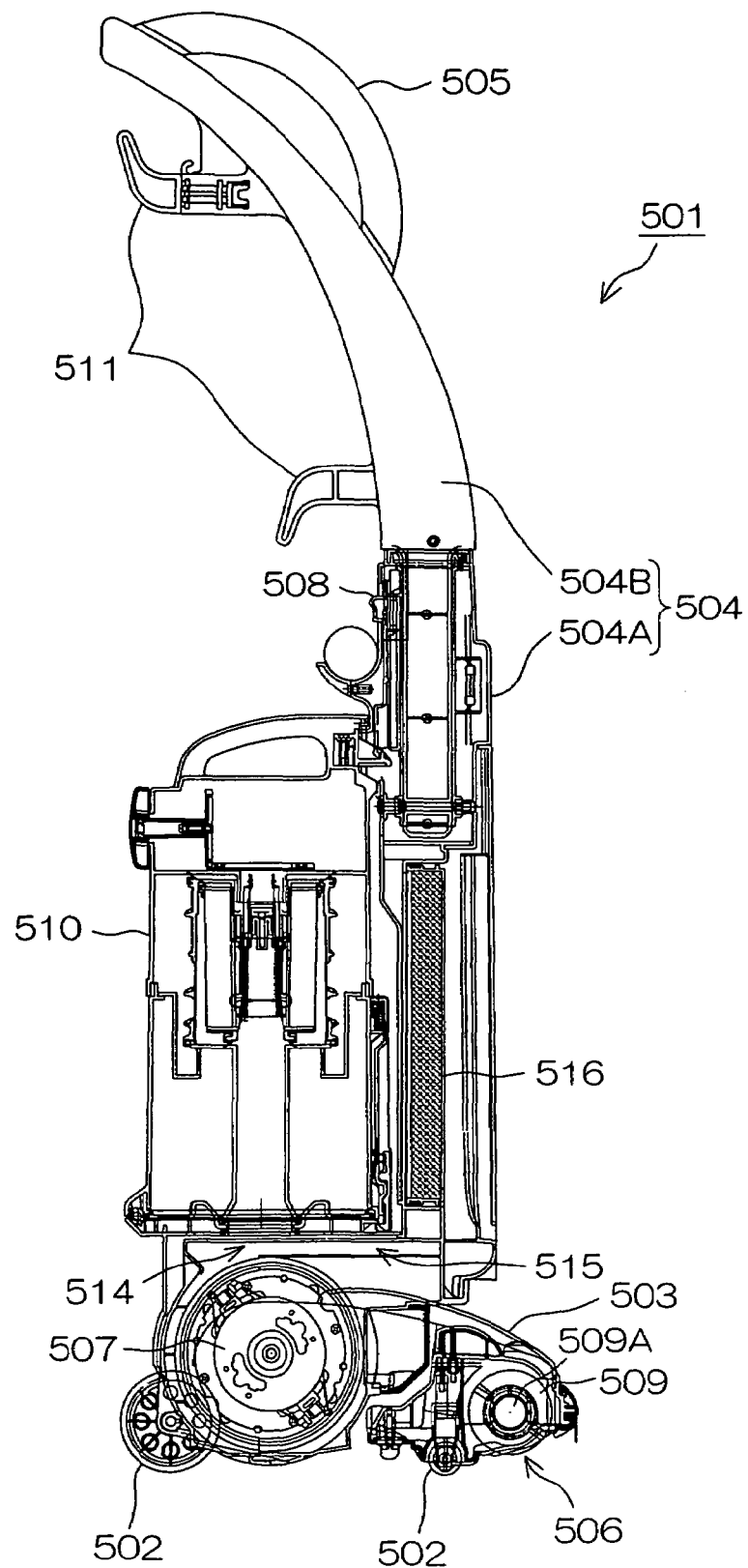
FIG. 22 is an outline view showing the structure of the cleaner according to a second embodiment of the present invention and this view is a left side view.
Figure 23:
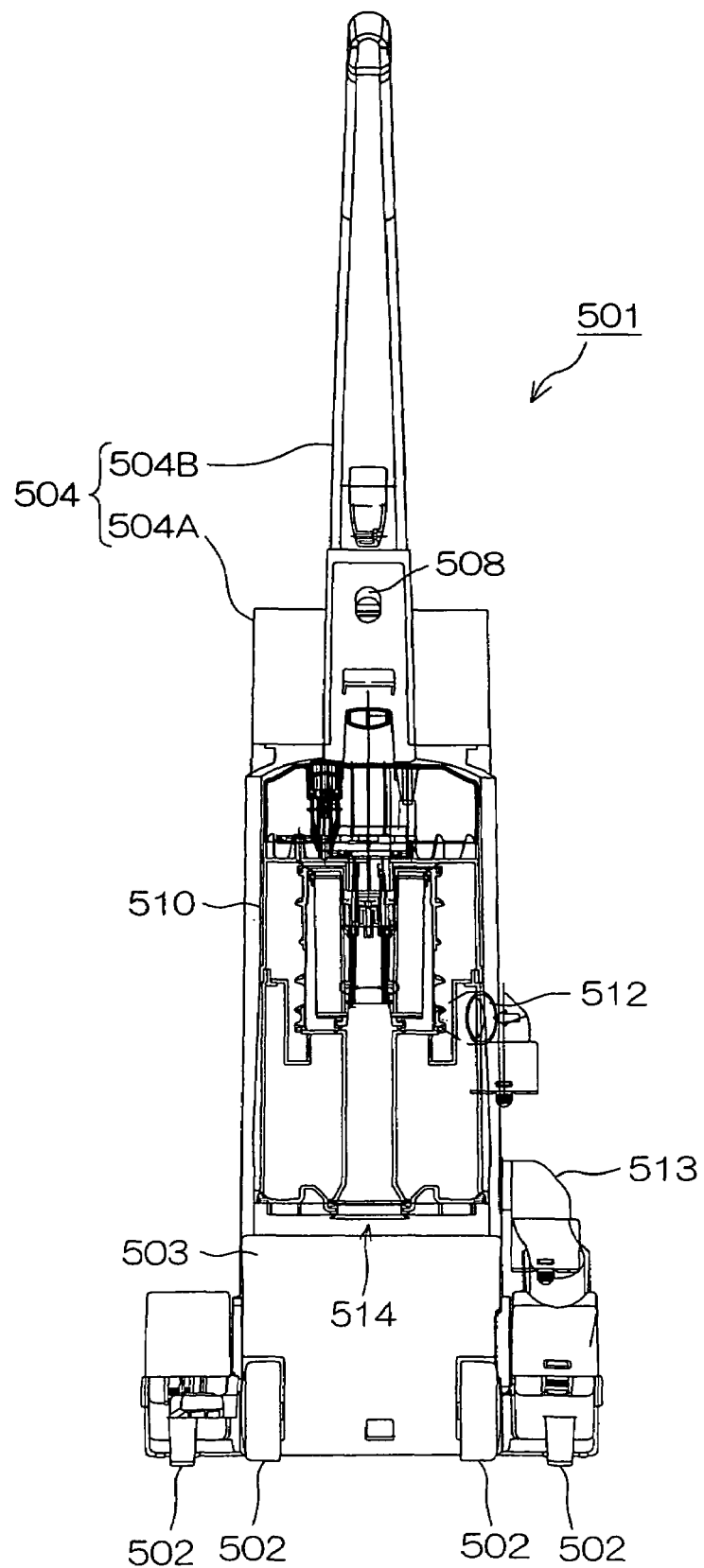
FIG. 23 is a rear view of the cleaner according to the second embodiment.

FIGS. 22 and 23 are outline views showing the structure of a cleaner 501 according to a second embodiment of the present invention. FIG. 22 is a left side view and FIG. 23 is a rear view. In each of these views, a part of the cleaner 501 is shown in a sectional view for simplification of the inner arrangement of the cleaner 501.

Referring to FIGS. 22 and 23, the cleaner 501 includes a suction section 503 provided with a plurality of wheels 502 which roll on the floor, and a long-shaped main body 504 pivotally attached, at one end (the lower end), to the suction section 503. This cleaner is an upright type (longitudinal type) cleaner which is used in a position somewhat inclined rearward with respect to the vertical direction by a user with holding a handle 505 provided at the other end (upper end) of the main body 504. When unused, this cleaner 501 can be maintained in a position in which the main body 504 is upright in the vertical direction with respect to the suction section 503 (position as shown in FIGS. 22 and 23).

A suction port 506 is provided on the front side of the bottom surface of the suction section 503. On the rear side of the inside of the suction section 503, provided is an electric blower 507 including a motor and a fan adapted to be rotated by the motor.

When cleaning with this cleaner 501, an electric power switch 508 provided on the main body 504 (for example, at the upper end of a belowmentioned lower member 504A) is turned on to start the driving of the electric blower 507, and thereby dust on the floor opposed to the suction port 506 is sucked through the suction port 506 into the suction section 503. On the front side of the inside of the suction section 503, provided is a rotary brush 509 rotatable around a rotation shaft 509A elongated in the lateral direction. The outer circumferential surface of this rotary brush 509 faces the suction port 506. When the electric blower 507 is driven, the rotary brush 509 is rotated by the pressure of the air sucked through the suction port 506 into the suction section 503 thereby to assist dust to flow through the suction port 506 into the suction section 503 and at the same time to prevent extraneous substances from flowing through the suction port 506 into the suction section 503. However, the rotary brush 509 may be driven to rotate by a motor.

A dust collecting unit 510 for catching dust contained in the air sucked through the suction section 503 is detachably attached to the main body 504. The main body 504 is provided with a lower member 504A which is disposed above the suction section 503 and carries the dust collecting unit 510, and an upper member 504B which has one end (the lower end) inserted into the upper portion of the lower member 504A and is curved so as to be inclined rearward as it extends upwardly, and the whole main body 504 has a shape elongated in the vertical direction. Two end portions of an arched handle 505 are connected to the upper portion of the front surface of the upper member 504B. When a user gripping this handle 505 applies a force in the direction of the elongation of the main body 504, a propelling force is given to the main body 504 and the suction section 503 connected to the main body 504 so that the cleaner 501 can move with the wheels 502 being rotated. Two code winding parts 511 are projected from the upper and lower end portions respectively of the rear surface of the upper member 504B. When the cleaner 501 is unused or a power code of the cleaner 501 is excessively long, the code can be wound round the two code winding parts 511 with the code stretched therebetween.

The dust collecting unit 510 is provided with an inlet port 512. Connected to the inlet port 512 of the dust collecting unit 510 is one end of a hose 513 the other end of which is connected to the suction section 503. Thereby, the air and dust sucked into the suction section 503 is transferred through the hose 513 toward the dust collecting unit 510 and taken through the inlet port 512 into the dust collecting unit 510. In the process that the air containing dust taken into the dust collecting unit 510 passes the dust collecting unit 510, dust contained in the air is caught, and the air is discharged downward through an air outlet port 514 provided in the bottom surface of the dust collecting unit 510. Provided inside the lower member 504A of the main body 504 is a guide path 515 which leads the air discharged from the air outlet port 514 toward the front side. The air led through the guide path 515 toward the front side is discharged through an air outlet filter 516 to the outside of the cleaner 501.

Figure 24:
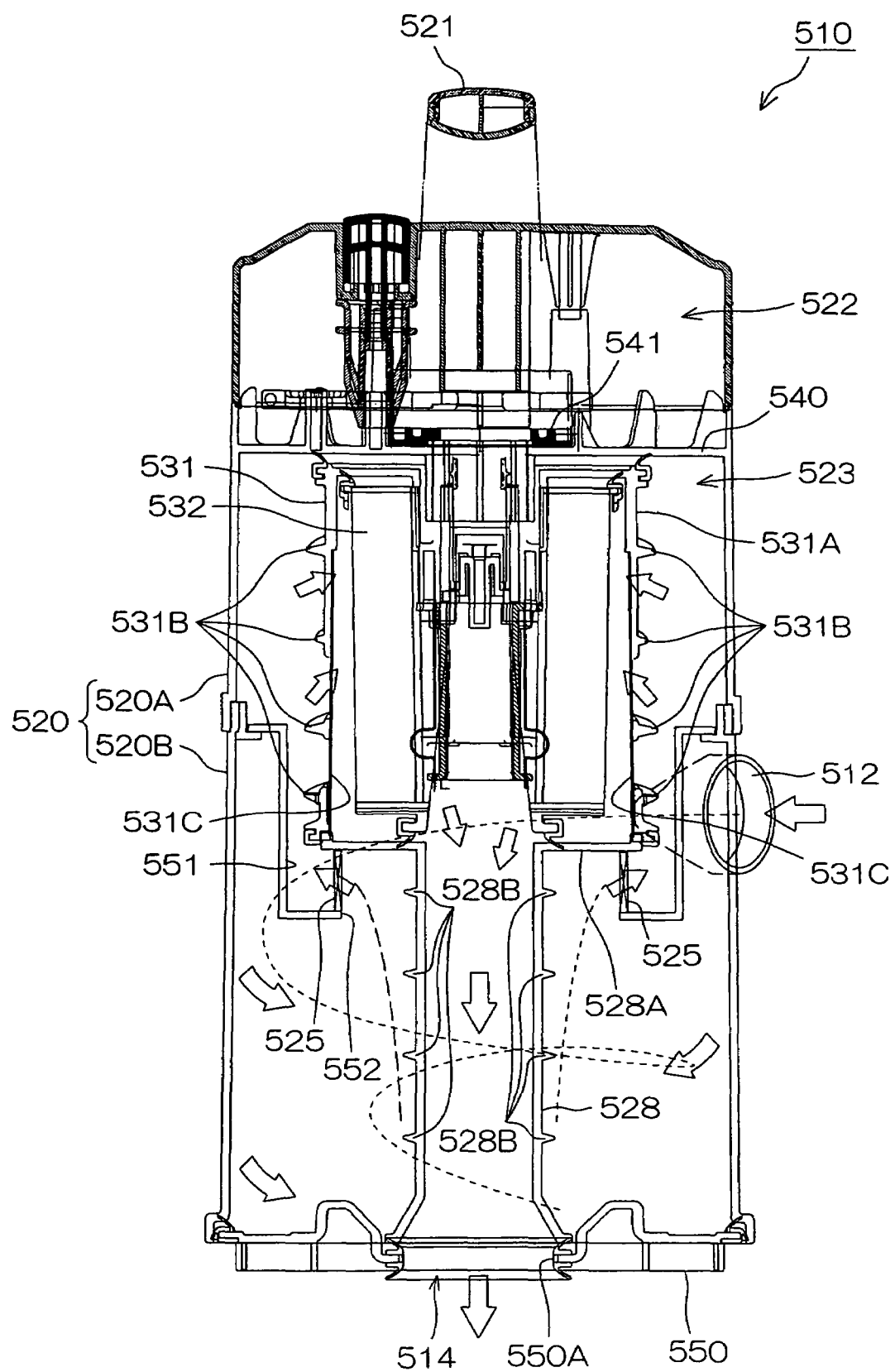
FIG. 24 is a sectional view of the dust collecting unit according to the second embodiment in which the dust collecting unit sectioned along a vertical plane in the lateral direction is seen from the rear side.
Figure 25:
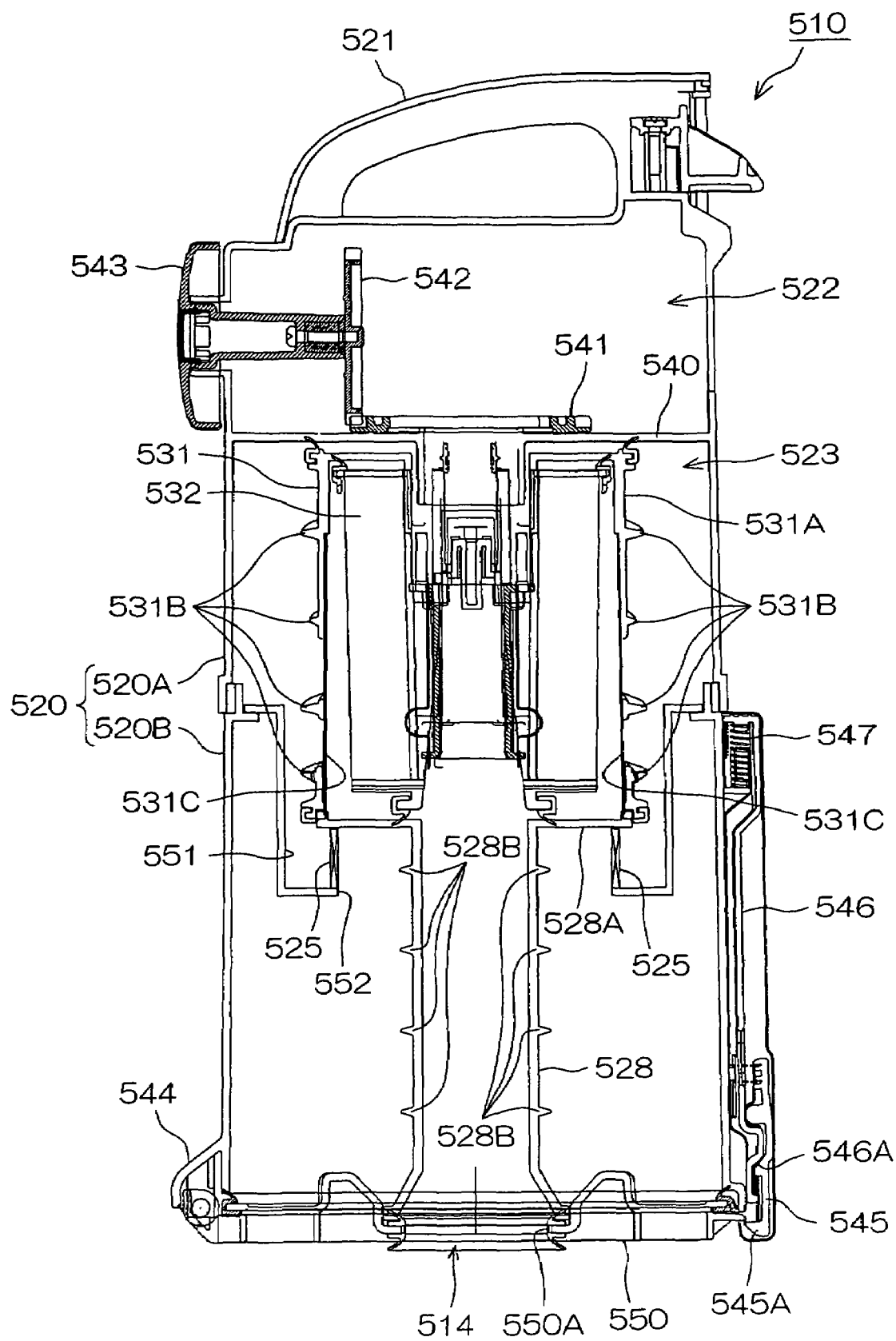
FIG. 25 is a sectional view of the dust collecting unit according to the second embodiment in which the dust collecting unit sectioned along a vertical plane in the longitudinal direction is seen from the left side.
Figure 26:
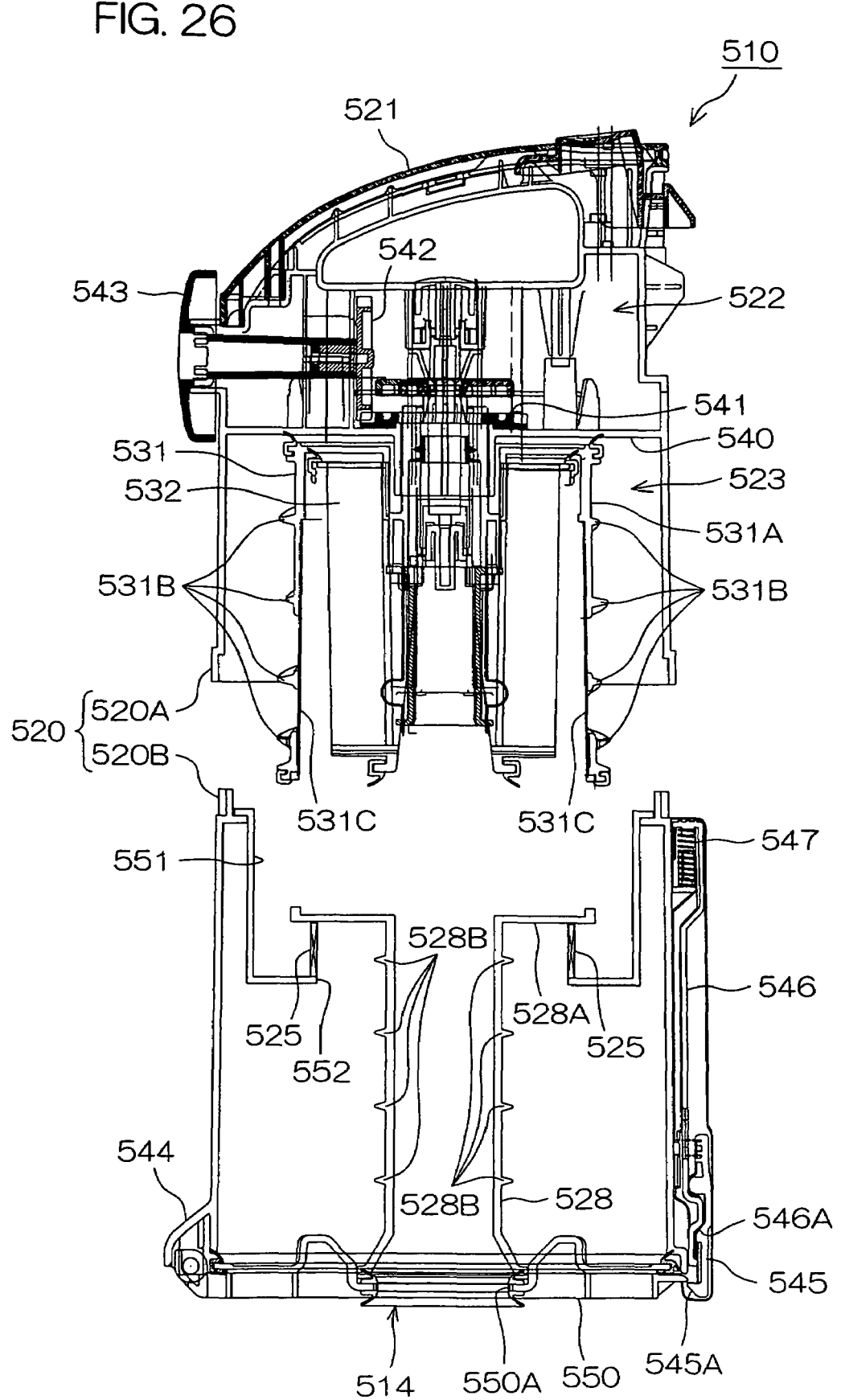
FIG. 26 is an exploded sectional view of the dust collecting unit according to the second embodiment.

FIG. 24 is a sectional view of the dust collecting unit 510 sectioned along a vertical plane in the lateral direction and seen from the left side. FIG. 25 is a sectional view of the dust collecting unit 510 sectioned along a vertical plane in the longitudinal direction and seen from the left side. FIG. 26 is an exploded sectional view of the dust collecting unit 510.

Referring to FIGS. 24 to 26, the dust collecting unit 510 includes a substantially cylindrical dust collecting case 520 which defines the outline of the dust collecting unit 510. On the upper end portion of the dust collecting case 520, provided is a gripping part 521 which is gripped when the dust collecting case 520 is attached to or detached from the cleaner 501.

The dust collecting case 520 includes an upper case 520A provided with the gripping part 521 on the upper end portion thereof and a lower case 520B to be attached upward to the upper case 520A on the same central axis. The inside of the upper case 520A is divided into an upper chamber 522 formed in the upper portion thereof and a lower chamber 523 formed in the lower portion thereof.

The lower case 520B is a substantially cylindrical member and provided with an inlet port 512 in the upper end portion thereof. The air taken in through the inlet port 512 flows in along a tangential line of the outer circumferential surface of the lower case 520B and swirls at a high speed in the lower case 520B. In the upper surface of the lower case 520B, a recess 551 of a substantially circular shape in a plan view is provided and an opening 552 is defined in the central portion of the bottom surface of this recess 551. In the lower case 520B, a cylindrical member 528 is extended in the vertical direction along the central axis thereof. The cylindrical member 528 penetrates the opening 552 to extend to the upper portion, and a flange part 528A is stretched in the diametrical direction at the upper end of the cylindrical member 528.

In the upper portion of the peripheral portion of the opening 552, provided is a cylindrical filter 525 in a substantially cylindrical shape. This cylindrical filter 525 has such a structure that a plurality of small holes (circular holes, slits or the like) are provided in the outer circumferential surface of a substantially cylindrical member. The cylindrical filter 525 is held between the peripheral portion of the opening 552 and the peripheral portion of the flange part 528A of the cylindrical member 528. A helically protruded rib 528B is provided on the outer circumferential surface of the cylindrical member 528.

The air taken through the inlet port 512 into the lower case 520B swirls at a high speed in the lower case 520B and then rises up to pass the cylindrical filter 525. At this time, rather large dust (larger dust) of dust contained in the air taken in through the inlet port 512 is caught by the cylindrical filter 525 to be stored in the lower case 520B.

In the lower chamber 523 of the upper case 520A, a cylindrical filter 531 in a substantially cylindrical shape is provided along the central axis thereof. The cylindrical filter 531 includes, for example, a resin-formed main body 531A, and a helically protruded rib 531B is provided on the outer circumferential surface of the main body 531A. In the lower portion of the main body 531A, the portion other than the rib 531B is opened and this opening is covered with a mesh filter 531C. In a state that the upper case 520A and the lower case 520B are connected to each other, the lower end portion of the main body 531A of the cylindrical filter 531 is put into the recess 551 of the lower case 520B, and the lower end surface of the main body 531A contacts the peripheral portion of the flange part 528A of the cylindrical member 528. In the cylindrical filter 531, provided is a paper filter 532 including a plurality of filter paper sheets disposed in substantially cylindrical shape so as to face each other. In a state that the upper case 520A and the lower case 520B are connected, the lower end surface of the paper filter 532 contacts the upper end surface of the cylindrical member 528 (the inner circumferential portion of the flange part 528A).

The air having passed through the cylindrical filter 525 of the lower case 520B flows into the lower chamber 523 of the upper case 520A closed by connecting the upper case 520A and the lower case 520B, passes through the mesh filter 531C of the cylindrical filter 531 and thereafter passes through the paper filter 532 disposed in the cylindrical filter 531. At this time, rather small dust (minute dust) contained in the air from which larger dust has been removed is caught by the mesh filter 531C and the paper filter 532. The air from which minute dust has been removed flows from the inside of the paper filter 532 through the cylindrical member 528 in the lower case 520B to be discharged from the lower end portion of the cylindrical member 528. The lower end portion of the cylindrical member 528 defines an air outlet port 514 for discharging the air from which dust has been removed to the outside of the dust collecting unit 510.

The bottom surface of the lower case 520B is opened and this opening can be opened or closed by a lid 550. An opening 550A is provided in the central portion of the lid 550. When the lid 550 is closed, the lower end portion of the cylindrical member 528 is fitted into the opening 550A and stretched downward. A latching part 554 for latching the rear end portion of the lid 550 is provided in the lower portion of the rear surface of the lower case 520B. On the other hand, a latching claw 545 for latching the front end portion of the lid 550 is attached to the front end portion of the lower portion of the outer surface of the lower case 520B. The latching claw 545 is pivotally movable in the longitudinal direction about the upper end portion thereof. In a state that the latching claw 545 is extended along the outer circumferential surface of the lower case 520B, a claw part 545A formed at the lower end of the latching claw 545 can be latched to the front end portion of the lid 550.

In the front end portion of the outer surface of the lower case 520B, an operating lever 546 is extended from the upper end portion to the lower end portion thereof. The operating lever 546 is operated for releasing the engagement of the latching claw 545 with the lid 550. The lower end portion of the operating lever 546 is inserted between the outer circumferential surface of the lower case 520B and the latching claw 545. The operating lever 546 is urged upward by a spring 547 provided at the upper end potion thereof. By pushing downward the operating lever 546 against the urging force of the spring 547, the latching claw 545 is pushed forward by an inclined surface 546A provided in the lower end portion of the operating lever 546 so that the engagement of the latching claw 545 with the lid 550 can be released. In a state that the latching claw 545 is disengaged, the lid 550 can be detached from the lower case 520B. By detaching the lid 550 from the lower case 520B, the opening in the bottom surface of the lower case 520B is opened and dust stored in the lower case 520B can be taken out through the opening in the bottom surface.

In this embodiment, the cylindrical filter 531 and the cylindrical member 528 can be integrally rotated. By connecting the upper case 520A and the lower case 520B, the lower end portion of the cylindrical filter 531 is connected with the upper end portion of the cylindrical member 528 so that the cylindrical filter 531 and the cylindrical member 528 are integrated. The upper end portion of the cylindrical filter 531 penetrates the division wall dividing the upper chamber 522 and the lower chamber 523 to face the upper chamber 522. With the lower surface of the flange part 541 provided on the outer circumferential surface of the upper end portion of the cylindrical filter 531 contacting the upper surface of the division wall 540, the cylindrical filter 531 is rotatably held.

A plurality of teeth are provided on the outer peripheral edge of the upper surface of the flange part 541 provided on the upper end portion of the cylindrical filter 531. A gear 542 engageable with the teeth is provided in the upper chamber 522 of the upper case 520A. A shaft of the gear 542 is extended in the longitudinal direction and is connected to a dial 543 stretched outward from the rear end of the circumferential surface of the upper case 520A. When the dial 543 is rotated, the flange part 541 is rotated via the gear 542, and the cylindrical filer 531 and the cylindrical member 528 connected thereto are rotated. With such an arrangement, even if dust is accumulated in the lower case 520B and dust clings to the outer circumferential surface of the cylindrical member 528, dust can be separated from the outer circumferential surface of the cylindrical member 528 by means of the helical rib 528B provided on the outer circumferential surface of the rotating cylindrical member 528. Therefore, by opening the lid 550 thereafter, dust in the lower case 520B can be easily taken out.

In this embodiment, since larger dust contained in the air taken in through the inlet port 512 can be caught by the cylindrical filter 525 and stored in the lower case 520B, larger dust can be prevented from flowing into the upper case 520A. Therefore, dust attached to the cylindrical filter 531 and the paper filter 532 disposed in the upper case 520A (lower chamber 523) is small in amount. As a result, it is not necessary to frequently remove dust (minute dust) attached to these filters, and the dust collecting unit 510 can be easily maintained.

Figure 27:
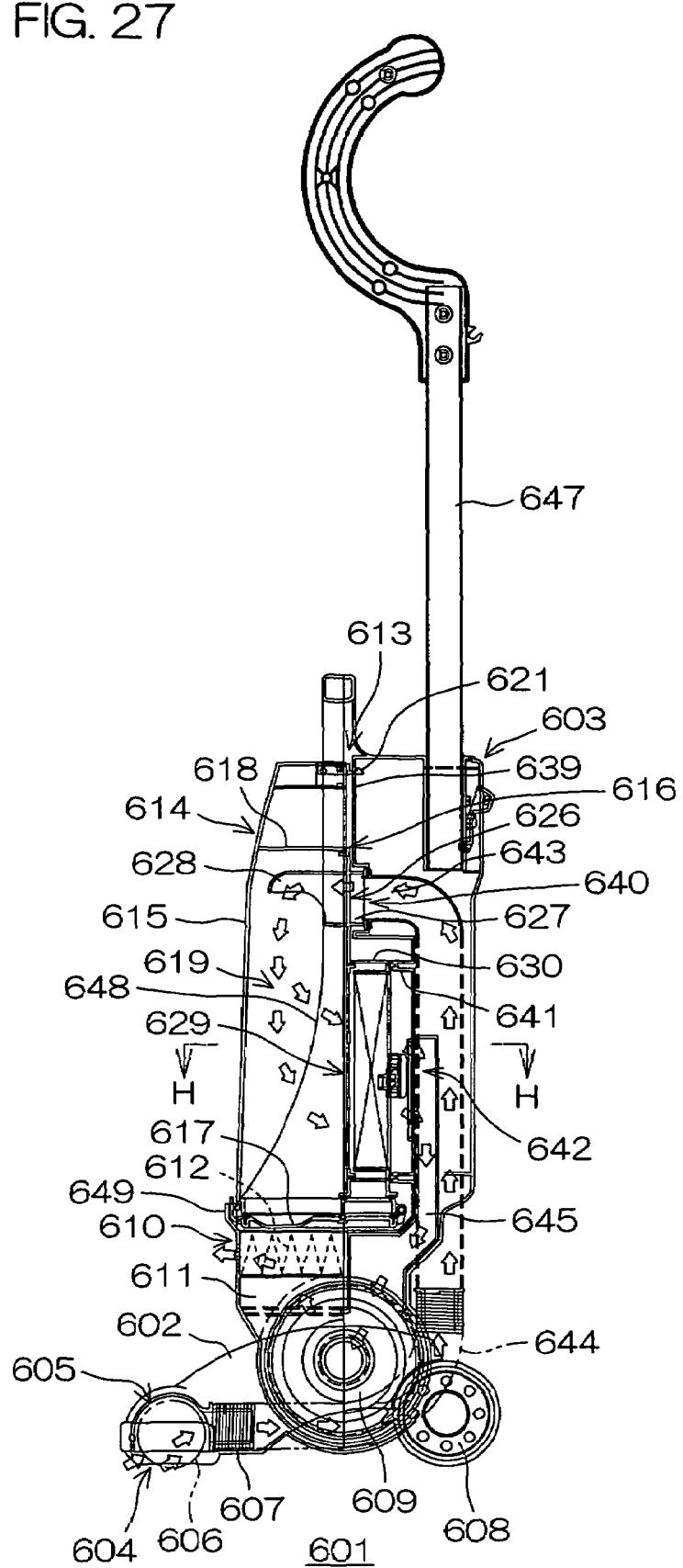
FIG. 27 is a sectional view showing the structure of a cleaner according to a third embodiment of the present invention.
Figure 28:
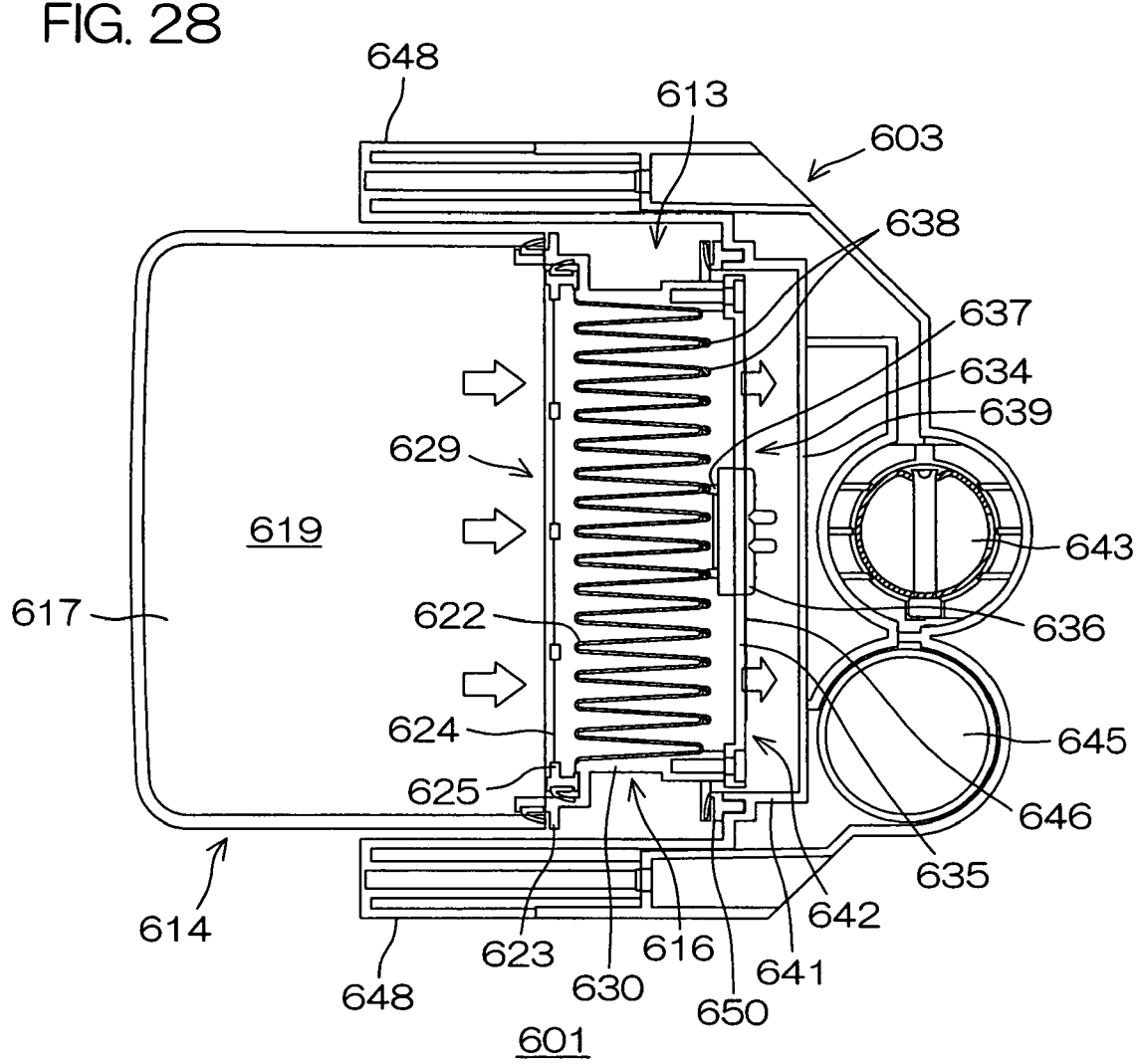
FIG. 28 is a sectional view of the cleaner of FIG. 27 seen along the section line H-H.

FIG. 27 is a sectional view showing the structure of a cleaner according to a third embodiment of the present invention. FIG. 28 is a sectional view of the cleaner of FIG. 27 seen along the section line H-H.

The cleaner 601 is an upright type (longitudinal type) cleaner and includes a suction section 602 and a vertically long-shaped main body 603 upwardly extended from the suction section 602. The suction section 602 is attached to the lower end of the main body 603 so as to move pivotally around the same axis line with the axis line of a rotation shaft of a motor of a belowmentioned electric blower 609. Therefore, this cleaner 601 can be used in a position in which the main body 603 is somewhat inclined with respect to the suction section 602. On the other hand, when unused, this cleaner 601 can be maintained in a position in which the main body 603 is upright in the vertical direction with respect to the suction section 602.

In this description, in the cleaner 601, the side toward which the main body 603 is inclined is regarded as the rear side and the side opposed to that rear side is regarded as the front side.

In the bottom surface of the front end portion of the suction section 602, a suction port 604 for sucking dust together with air is formed so as to be elongated in the lateral direction orthogonal to the longitudinal direction (in the direction perpendicular to the paper surface of FIG. 27). Further, in the front end portion of the suction section 602, provided is a rotary brush disposing portion 605 in communication with the suction port 604. In the rotary brush disposing portion 605, a rotary brush 606 is disposed so as to be rotatable around a rotation axis line extended in the lateral direction. To the rotary brush 606, a driving force is transmitted from a motor of the belowmentioned electric blower 609. When the motor of the electric blower 609 is driven, the driving force thereof is transmitted to the rotary brush 606 so that the rotary brush 606 rotates. With the rotation of this rotary brush 606, dust and the like on a surface to be cleaned such as a carpet surface are scraped up. And the scraped dust and the like are sucked into the suction port 604 by a suction force of the electric blower 609.

A motor to be used for rotating the rotary brush 606 may be provided separately from the motor of the electric blower 609.

Further, in the suction section 602, formed is a hose connecting portion 607 in a tubular shape rearwardly extended from the rotary brush disposing portion 605. The inside of the hose connecting portion 607 is communicated with the rotary brush disposing portion 605.

In the rear end portion of the suction section 602, wheels 608 are provided so as to be rotatable around a rotation axis line extended in the lateral direction. With the wheels 608 rolling on a floor surface, the cleaner 601 can be smoothly movable in the longitudinal direction.

In the lower end portion of the main body 603, provided is the electric blower 609 having a motor and a fan to be driven by the motor. The electric blower 609 is disposed in such a manner that the rotation shaft of the motor is in line with the lateral direction.

If the driving force of the motor of the electric blower 609 is not used for rotating the rotary brush 606, the electric blower 609 may be disposed in such a manner that the rotation shaft of the motor is in line with the longitudinal or vertical direction.

In the lower portion of the front surface of the main body 603 and at the same time in the portion oblique and upper front of the electric blower 609, an air outlet port 610 is provided for discharging air from the electric blower 609. Further, in the lower portion of the main body 603, an outlet air guide path 611 is formed for guiding air from the electronic blower 609 into the air outlet port 610. An air outlet port filter 612 for cleaning air from the electric blower 609 is removably provided in the portion of the outlet air guide path 611 adjacent to the air outlet port 610. As the air outlet port filter 612, a HEPA filter is used, for example. The air outlet port filter 612 has the second largest surface area next to a belowmentioned main filter 622 among all of the filters attached to this cleaner 601.

In the main body 603, a part above the outlet air guide path 611 constitutes a dust collecting case fitting section 613. In this dust collecting case fitting section 613, a dust collecting case 614 is removably fitted.

Figure 29:
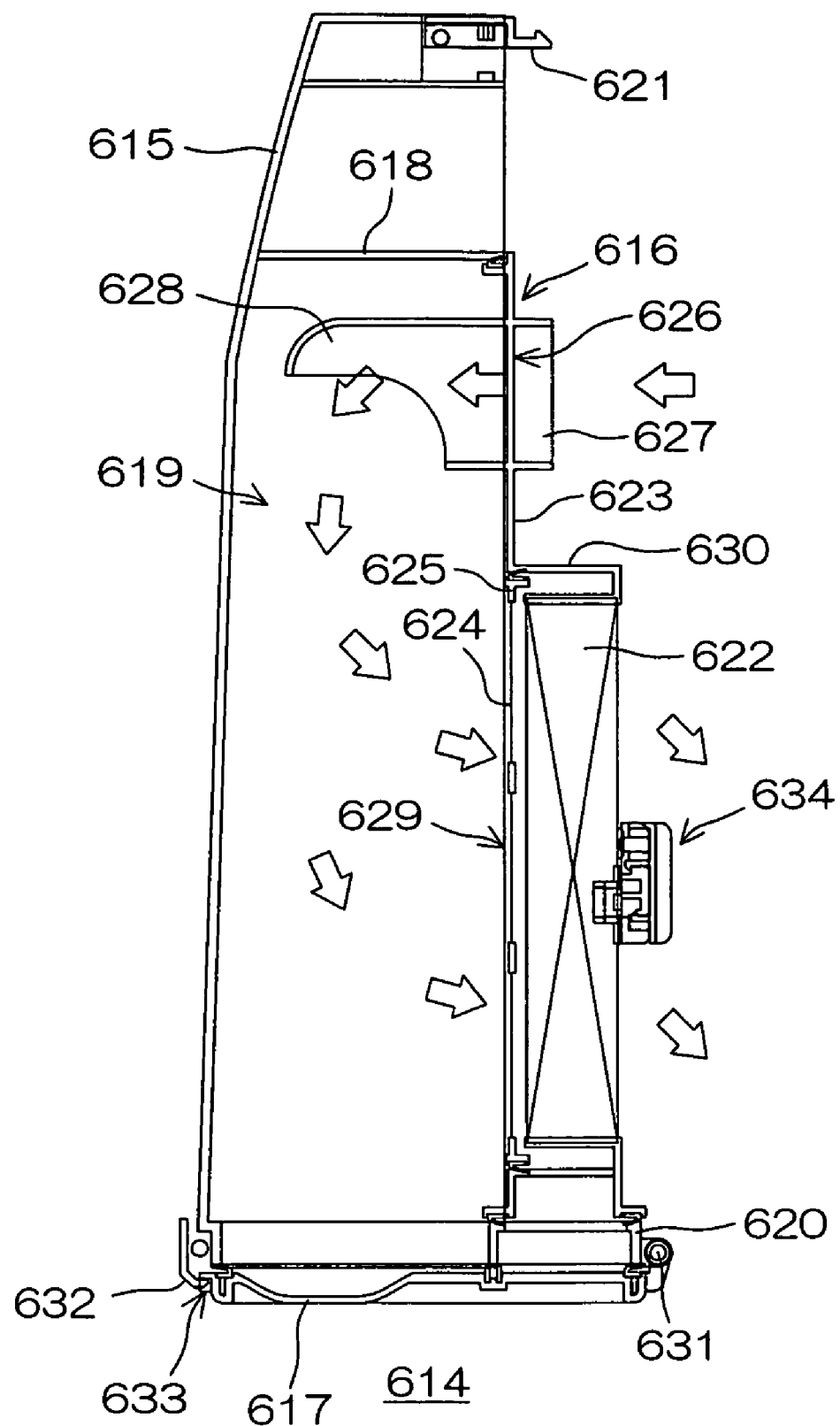
FIG. 29 is a sectional view of the dust collecting case shown in FIG. 27.

FIG. 29 is a sectional view of the dust collecting case 614.

The dust collecting case 614 comprises a case body 615, a filter supporting member 616 removably attached to the back surface (rear surface) of the case body 615, and an opening and closing member 617 attached to the bottom surface of the case body 615 so as to be opened and closed.

The case body 615 is formed in a substantially rectangular parallelepiped shape large in the vertical direction and small in thickness in the longitudinal direction, and the back surface and the bottom surface thereof are opened. In the upper portion of the case body 615, a division plate 618 is provided which is in a form of a thin plate extended in the longitudinal and lateral directions. A space below the division plate 618 inside the case body 615 constitutes a dust collecting chamber 619 for collecting dust sucked through the suction port 604. The sectional area of the dust collecting chamber 619 sectioned in the longitudinal direction becomes larger toward the lower portion thereof.

Further, in the lower end portion of the case body 615, provided is a rearwardly projected stop portion 620 onto which the lower end portion of a belowmentioned main filter supporting member 623 is latched. The stop portion 620 is formed in a rectangular shape long in the lateral direction in plan view and the upper surface thereof is widely opened.

Further, in the upper end portion of the case body 615, provided is a claw 621 to be latched onto the upper end portion of a belowmentioned opposed wall 639 of the dust collecting case fitting section 613 of the main body 603. Further, in the front portion of the bottom surface of the dust collecting case fitting section 613, an upwardly projected engagement wall portion 649 is formed. The dust collecting case 614 is fitted in the dust collecting case fitting section 613 in the following manner. First, the lower portion of the front surface of the case body 615 is engaged with the engagement wall portion 649. In this engaged state, the case body 615 pivotally moves in the rearward direction with the engaged portion being as a fulcrum and then the claw 621 is latched onto the upper end portion of the opposed wall 639. Thereby, the dust collecting case 614 is mounted onto the main body 603 with the upper portion and the lower portion of the case body 615 being latched onto the dust collecting case fitting section 613.

Further, though not shown, on the front surface of the case body 615, provided is a handle to be grasped when fitting or detaching the dust collecting case 614 in or from the dust collecting case fitting section 613 of the main body 603.

The filter supporting member 616 includes a main filter supporting member 623 for supporting the main filter 622 and a prefilter supporting member 625 for supporting a prefilter 624.

The filter supporting member 616, the main filter 622 supported thereby and the like are disposed outside the dust collecting chamber 619 of the case body 615. Since the main filter 622 and the like are disposed so as not to intrude into the dust collecting chamber 619, the shape of the inside of the dust collecting chamber 619 can be simplified (that is, the rear surface of the inside of the dust collecting chamber 619 can be made a flat surface). As a result, dust trapped by the inner surface of the dust collecting chamber 619 can be reduced and dust inside the dust collecting chamber 619 is smoothly discharged when the belowmentioned opening and closing member 617 is opened.

The main filter 622 is formed by alternately folding back an unwoven cloth in the longitudinal direction, and it is a pleat-shaped unwoven filter in which a number of vertically elongated folded-back portions 638 are arranged in the lateral direction. The main filter 622 has the largest surface area among the filters attached to the cleaner 601.

The upper edge of the main filter supporting member 623 is latched onto the rear end portion of the division plate 618 of the case body 615, and the lower end portion of the main filter supporting member 623 is latched onto the stop portion 620 of the case body 615, so that the main filter supporting member 623 is removably attached to the case body 615. By attaching the main filter supporting member 623 to the case body 615, the rear surface of the dust collecting chamber 619 in the case body 615 is closed. Packing is provided on the outer peripheral edge of the main filter supporting member 623, though not shown. When the main filter supporting member 623 is mounted on the case body 615, the clearance between the case body 615 and the main filter supporting member 623 is airtightly sealed.

In the upper end portion of the main filter supporting member 623, an inlet port 626 is formed which is substantially circular when seen in the rear surface. And a substantially circular-tube-shaped inlet port connecting portion 627 rearwardly extended from the periphery of the inlet port 626 and a guide portion 628 forwardly (into the dust collecting chamber 619) extended from the periphery of the inlet port 626 are formed integrally with the main filter supporting member 623. The guide portion 628 has such a shape that substantially a half of a half-sphere shaped head end portion of a circular supporting member 623 is cut off, and the head end portion thereof is opened off to the lower front.

Further, in the main filter supporting member 623, a case side outlet port 629 substantially rectangular when seen in the rear surface is formed below the inlet port 626. The case side outlet port 629 has a larger area than the area of the bottom surface (opening) portion of the case body 615 facing to the dust collecting chamber 619. And a peripheral wall portion 630 rearwardly projected from the periphery of the case side outlet port 629 is formed integrally with the main filter supporting member 623. The main filter 622 is disposed in a portion enclosed by the peripheral wall portion 630.

The prefilter 624 is formed of a resin material and integrally comprises a mesh-shaped filter portion and a lattice-shaped reinforcing portion for reinforcing the filter portion. The lattice-shaped reinforcing portion projects forwardly (on the side of the dust collecting chamber 619) from the filter portion in a smaller amount than the amount that projects rearwardly (on the side of the main filter 622) therefrom. Thereby, the surface of the filter portion facing to the dust collecting chamber 619 and the surface of the reinforcing portion facing to the dust collecting chamber 619 are disposed substantially in the same plane, so that the amount of dust trapped by the prefilter 624 when dust is discharged from the dust collecting chamber 619 can be more reduced. Further, the prefilter 624 has substantially the same size as the main filter 622 when seen in the rear surface, and the prefilter 624 has a surface area next to the air outlet filter 612 among the filters attached to this cleaner 601.

The prefilter supporting member 625 is formed in a shape of a frame for supporting the periphery of the prefilter 624. The upper edge of the prefilter supporting member 625 is latched onto the upper edge of the case side outlet port 629 of the main filter supporting member 623, and the lower edge of the prefilter supporting member 625 is latched to the lower edge of the case side outlet port 629. Thereby, the prefilter supporting member 625 is removably attached to the main filter supporting member 623. By attaching the prefilter supporting member 625 to the main filter supporting member 623, the case side outlet port 629 of the main filter supporting member 623 is closed in a communicated state through the prefilter 624. When the prefilter supporting member 625 is attached to the main filter supporting member 623, the prefilter supporting member 625, the prefilter 624 and the surface of the main filter supporting member 623 facing to the dust collecting chamber 619 are disposed substantially in the same plane and no large gap in level is formed therebetween. As a result, dust inside the dust collecting chamber 619 can be secured to discharge more smoothly.

Further, an additional filter such as tissue paper sheets can be disposed on the front surface of the prefilter 624. By disposing tissue paper sheets or the like, clogging of the prefilter 624 and the main filter 622 can be prevented.

The rear end portion of the opening and closing member 617 is pivotally supported by an opening and closing shaft 631 laterally extended behind the stop portion 620 of the case body 615. In the front end portion of the opening and closing member 617, formed is a recess 633 engageable with an engagement portion 632 provided in the front lower end portion of the case body 615. In the state that the recess 633 of the opening and closing member 617 is engaged with the engagement portion 632, the opening and closing member 617 closes the bottom surface of the case body 615. And by releasing the engagement between the engagement portion 632 and the recess 633 and downwardly pivoting the opening and closing member 617 around the opening and closing shaft 631 as a fulcrum, the bottom surface of the case body 615 can be opened.

Further, this dust collecting case 614 is provided with a dust remover 634 for removing dust caught by the main filter 622 from the main filter 622. As shown in FIG. 28, the dust remover 634 comprises a laterally elongated rail 635 stretched between two side walls of the peripheral wall portion 630 of the main filter supporting member 623, and a sliding member 636 slidable along the rail 635. In the sliding member 636, formed is a forwardly projected touching portion 637 which touches the folded-back portions of the main filter 622. By sliding the sliding member 636 along the rail 635, the touching portion 637 touches the folded-back portions of the main filter 622 one by one, so that the folded-back portions 638 of the main filter 622 is snapped by the touching portion 637. Due to the vibrations at this time, dust attached to the main filter 622 drops therefrom through the upper surface opening of the stop portion 620 of the case body 615 down onto the opening and closing member 617.

Referring to FIGS. 27, 28 again, the dust collecting case fitting section 613 has an opposed wall 639, which is opposed to the rear surface of the dust collecting case 614 when the dust collecting case 614 is fitted in the dust collecting case fitting section 613. Further, on both sides in the lateral direction of the dust collecting case fitting section 613, provided are cover portions 648 extended in the vertical and longitudinal directions. Each of these cover portions 648 covers a part of each of both side surfaces in the lateral direction of the dust collecting case 614 fitted in the dust collecting case fitting section 613. In the dust collecting case 614, the main filter 622 and the like are disposed outside (behind) the case body 615. However, in the state that the dust collecting case 614 is fitted in the dust collecting case fitting section 613, the main filter 622 and the like disposed outside the case body 615 are covered with the case body 615 and the cover portions 648 so that the main filter 622 and the like are not seen from outside. As a result, the appearance of this cleaner 601 is not spoiled.

In the opposed wall 639, formed is a suction air connecting port 640 to which the inlet port connecting port 627 of the dust collecting case 614 is connected. Further, the opposed wall 639 is provided with a division wall portion 641 opposed to the peripheral wall portion 630 of the main filter supporting member 623 throughout the whole periphery thereof when the dust collecting case 614 is fitted. This division wall portion 641 defines a space between the main filter 622 and the opposed wall 639. A packing 650 is provided throughout the whole periphery of the division wall portion 641. In the state that the dust collecting case 614 is fitted in the dust collecting case fitting section 613, the packing 650 is in contact with the peripheral wall portion 630 of the main filter supporting member 623, so that a space between the main filter supporting member 623 and the division wall portion 641 is kept airtight. Further, a main body side outlet port 642 is provided in the region enclosed by the division wall portion 641 of the opposed wall 639.

Further, behind the opposed wall 639 of the dust collecting case fitting section 613 of the main body 603, provided is a suction air guide path 643 for guiding air (including dust) sucked through the suction port 604 of the suction section 602 to the suction air connecting port 640. This suction air guide path 643 is connected at its upper end to the suction air connecting port 640, rearwardly extends a little and is bend down in the midway to extend downwardly. To the lower end of the suction air guide path 643, one end of a suction air hose 644 is connected. The other end of this suction air hose 644 is connected to the hose connecting portion 607 of the suction section 602.

Further, behind the opposed wall 639 of the dust collecting case fitting section 613, provided is an outlet path 645 for guiding air discharged from the main body side outlet port 642 to the electric blower 609.

Further, as shown in FIG. 28, in the main body side outlet port 642, a filter 646 for securely preventing extraneous substances contained in air discharged through the main body side outlet port 642 from flowing into the electric blower 609 and a lattice (not shown) are disposed in this order in the direction of the air stream. The filter 646 has the smallest surface area among all of the filters attached to this cleaner 601.

Further, the main body 603 is provided with a handle 647 extended from the upper end thereof. A user, with grasping this handle 647, can move the cleaner 601 forwardly by pushing the main body 603 through the handle 647, and rearwardly by pulling the main body 603 through the handle 647.

With the abovementioned structure, when the electric blower 609 is driven with the suction port 604 of the suction section 602 being opposed to a floor surface, dust on the floor surface together with air is sucked into the suction port 604 of the suction section 602. As shown with outline arrows in FIG. 27, air and dust sucked into the suction port 604 passes the hose connecting portion 607, the suction air hose 644, the suction air guide path 643, the suction air connecting port 640, the inlet port connecting portion 627, the inlet port 626 and the guide portion 628 in this order, thus to be introduced into the dust collecting chamber 619 of the dust collecting case 614. Air introduced into the dust collecting chamber 619 passes the case side outlet port 629, the prefilter 624, the main filter 622 and the filter 646 in this order and dust is caught through this process. Clean air having passed the filter 646 passes the main body side outlet port 642 and the outlet path 645 in this order, is sucked into the electric blower 609, and then passes the outlet air guide path 611 and the air outlet port filter 612 in this order, to be discharged through the air outlet port 610 to the outside of the cleaner 601.

Figure 30:
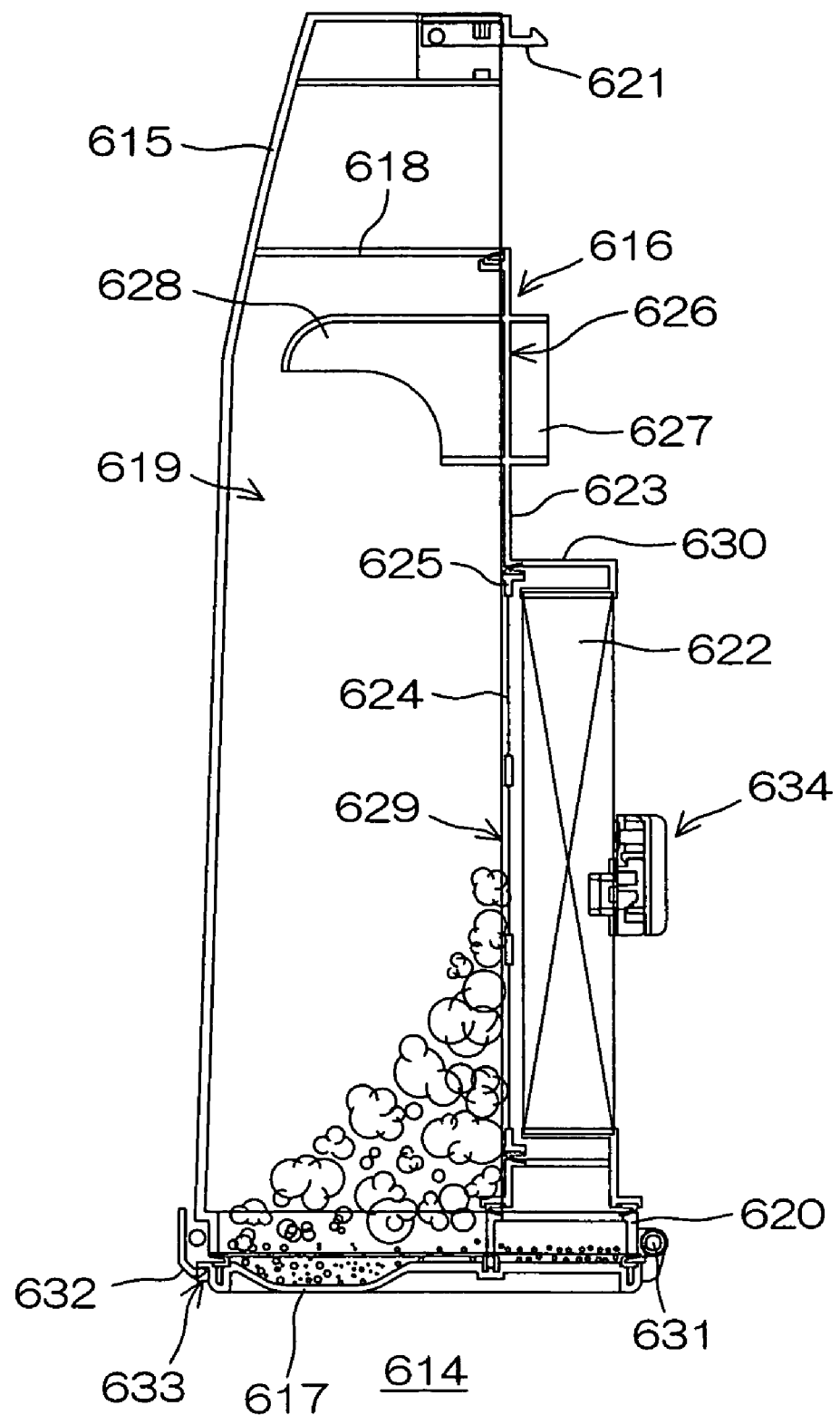
FIG. 30 is a sectional view of the duct collecting case shown in FIG. 27, showing dust is accumulated in a dust collecting chamber.
Figure 31:
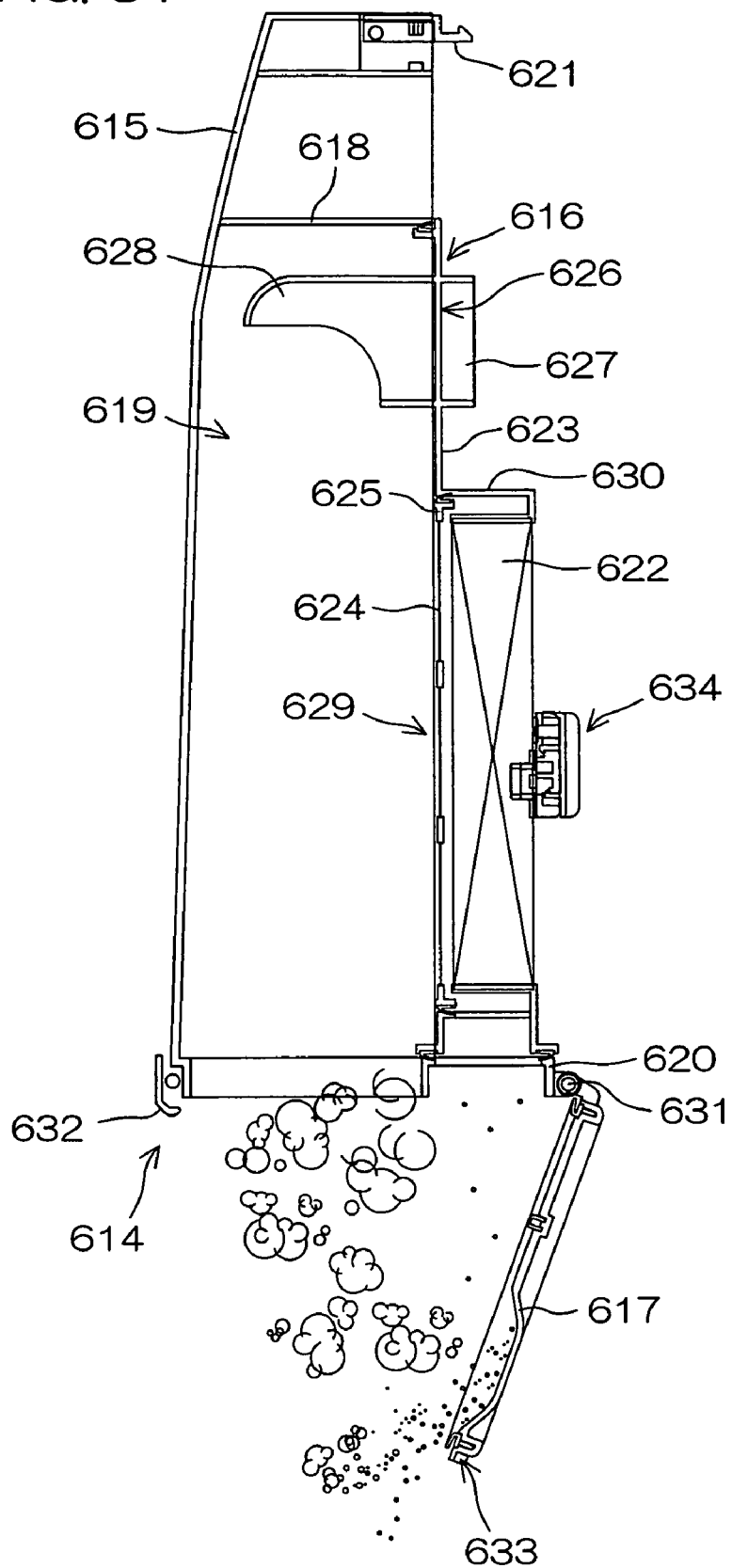
FIG. 31 is a sectional view of the duct collecting case shown in FIG. 27, showing the dust is discharged from the dust collecting chamber.

In the dust collecting chamber 619, as shown with outline arrows in FIG. 29, formed is an air stream flowing from the guide portion 628 disposed in the relatively upper portion to the case side outlet port 629 provided in the relatively lower portion. Since dust contained in this air stream is heavier than air, the amount (density) of dust in the air stream is larger in the air stream passing the relatively lower portion of the dust collecting chamber 619. Therefore, as shown in FIG. 30, in the dust collecting chamber 619, dust begins to be accumulated in a portion on the opening and closing member 617 near the prefilter 624 first. Then, while the accumulated dust being compressed by the air discharged from the dust collecting chamber 619 through the prefilter 624, and new dust is further accumulated and piled up on the compressed dust. Therefore, as shown in FIG. 31, by opening the opening and closing member 617 and thereby opening the bottom surface of the case body 615, dust accumulated on the opening and closing member 617 can be discharged at one operation. Further, since the dust collecting chamber 619 is formed to become larger in the lower portion thereof, dust accumulated on the opening and closing member 617 can be more smoothly discharged at one operation. Furthermore, when the opening and closing member 617 is opened, dust dropped from the main filter 622 down onto the opening and closing member 617 by the dust remover 634 can be discharged at the same time.

The inlet port 626 for introducing air and dust sucked through the suction port 604 of the suction section 602 into the dust collecting chamber 619 may be provided in the upper surface of the dust collecting chamber 619 (in the division plate 618 of the case body 615).

Further, the case side outlet port 629 may be provided in the side surface of the dust collecting chamber 619 with such a structure that one side surface of the dust collecting chamber 619 in the lateral direction is opened and the main filter supporting member 623 is attaches so as to close the opened side surface.

Even if the inlet port 626 is provided in the upper surface of the dust collecting chamber 619 and the case side outlet port 629 is provided in the side surface of the dust collecting chamber 619, dust begins to be accumulated in a portion on the opening and closing member 617 near the prefilter 624 first in the dust collecting chamber 619. Therefore, the same advantages with those of the structure of the abovementioned third embodiment can be obtained.

The present invention is not limited to the abovementioned embodiments but may be variously changed within the range of the appended claims.

For example, in the first embodiment, the guide member 24, 124, 224, 324 or 424 is not limited to one having a shape bent (or curved) at substantially 90 degrees, but may have a shape extended on a straight line.

The filter member 30, 130, 240, 330 or 430 is not limited to one having a two-layer structure including a mesh filter 31, 131, 231, 331 or 431 and a paper filter 32, 132, 232, 332 or 432, but may be one having a one-layer structure comprising either of a mesh filter or a paper filter, or may be one having a more-than-three-layer structure combining these filters with other filters.

The filter member 30, 130, 230, 330 or 430 is not limited to a mesh filter 31, 131, 231, 331 or 431 and a paper filter 32, 132, 232, 332 or 432, but may comprises other filters.

The air port 26, 126, 226, 326 or 426 of the cylindrical filter 25, 125, 225, 325 or 425 is not covered limitedly with the mesh filter 27, 127, 227, 327 or 427, but may be covered with another filter or may not be covered with any filter.

In the second embodiment, the cylindrical filter 525 provided in the lower case 520B is not limited to one comprising a substantially cylindrical member provided with a plurality of small holes in the outer circumferential surface thereof, but maybe one including a mesh filter.

The filter provided in the upper case 520A is not limited to one having a two-layer structure including a mesh filter 531C and a paper filter 532, but may be one having a one-layer structure comprising either of a mesh filter or a paper filter, or may be one having a more-than-three-layer structure combining these filters with other filters.

The filter provided in the upper case 520A is not limited to the mesh filter 531C or the paper filter 532, but may comprise another filter.

Although the present invention has been described and illustrated in detail, it is clearly understood that the same is by way of illustration and example only and is not to be taken by way of limitation, the spirit and scope of the present invention being limited only by the terms of the appended claims.

The disclosure of Japanese patent application Serial No. 2004-134094, filed on Apr. 28, 2004, is incorporated herein by reference.

What is claimed is:

1. A dust collecting case for use in an upright type cleaner including
    a dust collecting chamber having an inlet port for introducing air containing dust therethrough and an outlet port provided in a portion of the side surface lower than the inlet port, and in which an air stream flowing from the inlet port toward the outlet port is formed inside, and
    a filter disposed in the outlet port for removing dust contained in air passing through the outlet port.

2. A dust collecting case for use in an upright type cleaner according to claim 1, further including an opening and closing member for opening and closing the bottom surface of the dust collecting chamber.

3. A dust collecting case for use in an upright type cleaner according to claim 2, further including a dust remover for dropping dust caught by the filter down onto the opening and closing member.

4. An upright type cleaner including
    a dust collecting chamber having an inlet port for introducing air containing dust therethrough and an outlet port provided in a portion of the side surface lower than the inlet port,
    a filter disposed in the outlet port for removing dust contained in air passing through the outlet port, and
    an electric blower for generating an air stream flowing from the inlet port toward the outlet port in the dust collecting chamber, in which
    thereby an air stream is generated to cause dust to be accumulated and piled up from the lower side of the filter in the dust collecting chamber when the electric blower is driven.

5. A cleaner according to claim 4, further including an opening and closing member for opening and closing the bottom surface of the dust collecting chamber.

* * * * *